US011194159B2

(12) United States Patent
Popovich et al.

(10) Patent No.: US 11,194,159 B2
(45) Date of Patent: Dec. 7, 2021

(54) ENVIRONMENTALLY ISOLATED WAVEGUIDE DISPLAY

(71) Applicant: DigiLens Inc., Sunnyvale, CA (US)

(72) Inventors: Milan Momcilo Popovich, Leicester (GB); Jonathan David Waldern, Los Altos Hills, CA (US); Alastair John Grant, San Jose, CA (US)

(73) Assignee: DigiLens Inc., Sunnyvale, CA (US)

( * ) Notice: Subject to any disclaimer, the term of this patent is extended or adjusted under 35 U.S.C. 154(b) by 0 days.

(21) Appl. No.: 16/593,606

(22) Filed: Oct. 4, 2019

(65) Prior Publication Data

US 2020/0064637 A1    Feb. 27, 2020

Related U.S. Application Data

(63) Continuation of application No. 15/543,016, filed as application No. PCT/GB2016/000005 on Jan. 12, 2016, now Pat. No. 10,437,064.

(Continued)

(51) Int. Cl.
*G02B 27/14* (2006.01)
*G02B 27/01* (2006.01)
(Continued)

(52) U.S. Cl.
CPC ......... *G02B 27/0172* (2013.01); *G02B 6/003* (2013.01); *G02B 6/0016* (2013.01);
(Continued)

(58) Field of Classification Search
CPC .. G02B 27/0172; G02B 6/0016; G02B 6/003; G02B 6/0035; G02B 6/0045;
(Continued)

(56) References Cited

U.S. PATENT DOCUMENTS

| | | | |
|---|---|---|---|
| 3,804,496 A | 4/1974 | Crane et al. | |
| 4,028,725 A | 6/1977 | Lewis | |

(Continued)

FOREIGN PATENT DOCUMENTS

| | | |
|---|---|---|
| CN | 1066936 A | 12/1992 |
| CN | 104136952 A | 11/2014 |

(Continued)

OTHER PUBLICATIONS

International Preliminary Report on Patentability for International Application PCT/GB2013/000210, dated Nov. 11, 2014, dated Nov. 20, 2014, 6 pgs.

(Continued)

*Primary Examiner* — William Choi
(74) *Attorney, Agent, or Firm* — KPPB LLP

(57) ABSTRACT

A waveguide display is provided comprising: an input image generator providing image light projected over a field of view; a waveguide having first and second external surfaces; and at least one grating optically coupled to the waveguide for extracting light towards a viewer. The waveguide has a lateral refractive index variation between said external surfaces that prevents any ray propagated within the waveguide from optically interacting with at least one of the external surfaces.

19 Claims, 11 Drawing Sheets

Related U.S. Application Data

(60) Provisional application No. 62/125,066, filed on Jan. 12, 2015.

(51) Int. Cl.
*F21V 8/00* (2006.01)
*G02B 6/34* (2006.01)

(52) U.S. Cl.
CPC .......... *G02B 6/0035* (2013.01); *G02B 6/0045* (2013.01); *G02B 6/0058* (2013.01); *G02B 6/0076* (2013.01); *G02B 27/0101* (2013.01); *G02B 6/34* (2013.01); *G02B 2027/013* (2013.01); *G02B 2027/0118* (2013.01); *G02B 2027/0125* (2013.01)

(58) Field of Classification Search
CPC ............. G02B 6/0058; G02B 6/0076; G02B 27/0101; G02B 6/34; G02B 2027/0118; G02B 2027/0125; G02B 2027/013
USPC ............... 359/629, 630, 631, 633, 652–654; 345/7–9
See application file for complete search history.

(56) References Cited

U.S. PATENT DOCUMENTS

| | | | |
|---|---|---|---|
| 4,133,152 A | 1/1979 | Penrose | |
| 4,852,988 A | 8/1989 | Velez et al. | |
| 5,138,687 A | 8/1992 | Horie et al. | |
| 5,210,801 A | 5/1993 | Fournier et al. | |
| 5,410,376 A | 4/1995 | Cornsweet et al. | |
| 5,462,700 A | 10/1995 | Beeson et al. | |
| 5,481,385 A | 1/1996 | Zimmerman et al. | |
| 5,760,960 A | 6/1998 | Lin et al. | |
| 6,084,998 A | 7/2000 | Straayer | |
| 6,172,792 B1 | 1/2001 | Jepsen et al. | |
| 6,351,273 B1 | 2/2002 | Lemelson et al. | |
| 6,510,263 B1 | 1/2003 | Maisenhoelder et al. | |
| 6,876,791 B2 | 4/2005 | Murashima et al. | |
| 7,050,674 B2 | 5/2006 | Lee et al. | |
| 7,167,616 B2 | 1/2007 | Ling et al. | |
| 7,218,817 B2 | 5/2007 | Magnusson et al. | |
| 7,248,765 B2 | 7/2007 | Lee et al. | |
| 7,349,612 B2 | 3/2008 | Nishii et al. | |
| 7,356,218 B2 | 4/2008 | Kato et al. | |
| 7,394,961 B2 | 7/2008 | Kornilovich et al. | |
| 7,542,210 B2 | 6/2009 | Chirieleison | |
| 7,558,446 B2 | 7/2009 | Wimberger-friedl et al. | |
| 7,711,228 B2 | 5/2010 | Noda et al. | |
| 7,936,513 B2 | 5/2011 | Wu et al. | |
| 8,120,848 B2 | 2/2012 | Isano | |
| 8,152,353 B2 | 4/2012 | Yang et al. | |
| 8,335,414 B2 | 12/2012 | Zinoviev et al. | |
| 8,396,341 B2 | 3/2013 | Lee et al. | |
| 8,929,589 B2 | 1/2015 | Publicover et al. | |
| 8,934,743 B2 | 1/2015 | Nishiwaki et al. | |
| 9,103,978 B2 | 8/2015 | Nishiwaki et al. | |
| 9,122,015 B2 | 9/2015 | Shimizu | |
| 9,188,717 B2 | 11/2015 | Nishiwaki | |
| 9,239,507 B2 | 1/2016 | Chen et al. | |
| 9,316,786 B2 | 4/2016 | Nishiwaki et al. | |
| 9,335,548 B1 | 5/2016 | Cakmakci et al. | |
| 9,429,692 B1 | 8/2016 | Saarikko et al. | |
| 9,435,961 B2 | 9/2016 | Jiang | |
| 9,456,744 B2 | 10/2016 | Popovich et al. | |
| 9,484,482 B2 | 11/2016 | Hsu et al. | |
| 9,513,480 B2 | 12/2016 | Saarikko et al. | |
| 9,535,253 B2 | 1/2017 | Levola et al. | |
| 9,739,950 B2 | 8/2017 | Sqalli et al. | |
| 9,791,696 B2 | 10/2017 | Woltman et al. | |
| 9,804,389 B2 | 10/2017 | Popovich et al. | |
| 9,899,800 B2 | 2/2018 | Ferrotti et al. | |
| 9,915,825 B2 | 3/2018 | Robbins et al. | |
| 9,939,577 B2 | 4/2018 | Inoue et al. | |
| 9,939,628 B2 | 4/2018 | Basset et al. | |
| 10,107,966 B1 | 10/2018 | Horibe et al. | |
| 10,162,181 B2 | 12/2018 | Webster et al. | |
| 10,197,804 B2 | 2/2019 | Stenberg et al. | |
| 10,209,517 B2 | 2/2019 | Popovich et al. | |
| 10,241,332 B2 | 3/2019 | Vallius | |
| 10,281,725 B2 | 5/2019 | Yokoyama | |
| 10,345,519 B1 | 7/2019 | Miller et al. | |
| 10,423,222 B2 | 9/2019 | Popovich et al. | |
| 10,437,051 B2 | 10/2019 | Popovich et al. | |
| 10,437,064 B2 | 10/2019 | Popovich et al. | |
| 2002/0150337 A1 | 10/2002 | Fujimaki | |
| 2002/0167462 A1 | 11/2002 | Lewis et al. | |
| 2003/0076590 A1 | 4/2003 | Kramer | |
| 2004/0108971 A1 | 6/2004 | Waldern et al. | |
| 2004/0125454 A1 | 7/2004 | Kawasaki et al. | |
| 2005/0141811 A1 | 6/2005 | Yang et al. | |
| 2007/0115553 A1 | 5/2007 | Chang-Hasnain et al. | |
| 2008/0298740 A1 | 12/2008 | Hlousek et al. | |
| 2010/0084261 A1 | 4/2010 | Lee et al. | |
| 2010/0141905 A1 | 6/2010 | Burke | |
| 2010/0202725 A1 | 8/2010 | Popovich et al. | |
| 2010/0232016 A1 | 9/2010 | Landa et al. | |
| 2010/0277803 A1 | 11/2010 | Pockett et al. | |
| 2011/0216255 A1 | 9/2011 | Miyauchi et al. | |
| 2012/0027347 A1 | 2/2012 | Mathai et al. | |
| 2012/0328234 A1 | 12/2012 | Lu et al. | |
| 2013/0101253 A1 | 4/2013 | Popovich et al. | |
| 2013/0163928 A1 | 6/2013 | Wang et al. | |
| 2013/0312811 A1 | 11/2013 | Aspnes et al. | |
| 2014/0022616 A1 | 1/2014 | Popovich et al. | |
| 2014/0168260 A1* | 6/2014 | O'Brien | G02B 27/0172 345/633 |
| 2014/0198896 A1 | 7/2014 | Hemmendorff et al. | |
| 2014/0268353 A1 | 9/2014 | Fujimura et al. | |
| 2015/0211960 A1 | 7/2015 | Shimizu | |
| 2015/0247975 A1 | 9/2015 | Abovitz et al. | |
| 2015/0289762 A1 | 10/2015 | Popovich et al. | |
| 2016/0209657 A1 | 7/2016 | Popovich et al. | |
| 2017/0031160 A1 | 2/2017 | Popovich et al. | |
| 2017/0138789 A1 | 5/2017 | Ivanov | |
| 2017/0299793 A1 | 10/2017 | Fattal | |
| 2017/0299794 A1 | 10/2017 | Fattal | |
| 2017/0307800 A1 | 10/2017 | Fattal | |
| 2018/0059305 A1 | 3/2018 | Popovich et al. | |
| 2018/0067251 A1 | 3/2018 | Baldwin et al. | |
| 2018/0113303 A1 | 4/2018 | Popovich et al. | |
| 2018/0120669 A1 | 5/2018 | Popovich et al. | |
| 2018/0129060 A1 | 5/2018 | Lee et al. | |
| 2018/0143438 A1 | 5/2018 | Oh | |
| 2018/0143449 A1 | 5/2018 | Popovich et al. | |
| 2018/0188691 A1 | 7/2018 | Fattal | |
| 2018/0232048 A1 | 8/2018 | Popovich et al. | |
| 2018/0275350 A1 | 9/2018 | Oh et al. | |
| 2018/0284440 A1 | 10/2018 | Popovich et al. | |
| 2019/0041634 A1 | 2/2019 | Popovich et al. | |
| 2019/0072723 A1 | 3/2019 | Waldern et al. | |
| 2019/0114484 A1 | 4/2019 | Keech et al. | |
| 2019/0129085 A1 | 5/2019 | Waldern et al. | |
| 2019/0162962 A1 | 5/2019 | Leighton et al. | |
| 2019/0162963 A1 | 5/2019 | Leighton et al. | |
| 2019/0179153 A1 | 6/2019 | Popovich et al. | |
| 2019/0212557 A1 | 7/2019 | Waldern et al. | |
| 2019/0212588 A1 | 7/2019 | Waldern et al. | |
| 2019/0243142 A1 | 8/2019 | Tekolste et al. | |
| 2019/0285796 A1 | 9/2019 | Waldern et al. | |
| 2019/0293880 A1 | 9/2019 | Nishiwaki et al. | |
| 2020/0341272 A1 | 10/2020 | Popovich et al. | |
| 2021/0063634 A1 | 3/2021 | Waldern et al. | |

FOREIGN PATENT DOCUMENTS

| | | |
|---|---|---|
| CN | 106842397 A | 6/2017 |
| CN | 108107506 A | 6/2018 |
| CN | 109073889 A | 12/2018 |
| CN | 208621784 U | 3/2019 |
| CN | 107873086 B | 3/2020 |
| CN | 111323867 A | 6/2020 |
| DE | 10221837 A1 | 12/2003 |

(56) References Cited

FOREIGN PATENT DOCUMENTS

| | | |
|---|---|---|
| DE | 102006036831 A1 | 2/2008 |
| EP | 2634605 B1 | 10/2015 |
| EP | 3198192 A1 | 8/2017 |
| EP | 3398007 A1 | 11/2018 |
| EP | 3245551 B1 | 9/2019 |
| FR | 2975506 A1 | 11/2012 |
| JP | 2011158907 A | 8/2011 |
| JP | 5588794 B2 | 9/2014 |
| JP | 5646748 B2 | 11/2014 |
| KR | 100803288 B1 | 2/2008 |
| KR | 20170031357 A | 3/2017 |
| WO | 2004023174 A2 | 3/2004 |
| WO | 2008011066 A2 | 1/2008 |
| WO | 2008011066 A9 | 5/2008 |
| WO | 2008100545 A2 | 8/2008 |
| WO | 2008011066 A3 | 12/2008 |
| WO | 2010078856 A1 | 7/2010 |
| WO | 2010131046 A1 | 11/2010 |
| WO | 2013163347 A1 | 10/2013 |
| WO | 2016054092 A1 | 4/2016 |
| WO | 2016087442 A1 | 6/2016 |
| WO | 2016116733 A1 | 7/2016 |
| WO | 2016181108 A1 | 11/2016 |
| WO | 2017134412 A1 | 8/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018102834 A2 | 6/2018 |
| WO | 2018096359 A3 | 7/2018 |
| WO | 2018150163 A1 | 8/2018 |
| WO | 2019077307 A1 | 4/2019 |
| WO | 2019122806 A1 | 6/2019 |
| WO | 2019171038 A1 | 9/2019 |
| WO | 2020212682 A1 | 10/2020 |
| WO | 2021032982 A1 | 2/2021 |
| WO | 2021032983 A1 | 2/2021 |
| WO | 2021041949 A1 | 3/2021 |
| WO | 2021044121 A1 | 3/2021 |

OTHER PUBLICATIONS

International Preliminary Report on Patentability for International Application PCT/GB2014/000197, dated Nov. 24, 2015, dated Dec. 3, 2015, 7 pgs.
International Preliminary Report on Patentability for International Application PCT/GB2017/000015, Report Completed Aug. 7, 2018, dated Aug. 16, 2018, 7 Pgs.
International Search Report and Written Opinion for International Application No. PCT/GB2017/000015, Search completed Apr. 25, 2017, dated May 8, 2017, 10 Pgs.
International Search Report for PCT/GB2013/000210, completed by the European Patent Office on Aug. 12, 2013, 3 pgs.
International Search Report for PCT/GB2014/000197, Completed by the European Patent Office on Jul. 31, 2014, 3 Pages.
Written Opinion for International Application No. PCT/GB2014/000197, Search completed Jul. 31, 2014, dated Aug. 7, 2014, 6 Pgs.
Written Opinion for International Application No. PCT/GB2016/000051, Search completed Aug. 11, 2016 , dated Aug. 22, 2016, 6 Pgs.
Written Opinion for International Application PCT/GB2013/000210, completed Aug. 12, 2013, dated Aug. 20, 2013, 5 pgs.
Levin et al., "A Closed Form Solution To Natural Image Matting", Illumination & Displays 3D Visualization and Imaging Systems Laboratory (3DVIS) College of Optical Sciences University of Arizona Tucson, 2014, 8 pgs.
Kim et al., "Fabrication of Reflective Holographic PDLC for Blue", Molecular Crystals and Liquid Crystals Science, 2001, vol. 368, pp. 3845-3853.
Natarajan et al., "Electro-Optical Switching Characteristics of Volume Holograms in Polymer Dispersed Liquid Crystals", J. of Nonlinear Optical Physics Materials, Jan. 1996, vol. 5, No. 1, pp. 89-98.
Gerritsen et al., "Application of Kogelnik's two-wave theory to deep, slanted, highly efficient, relief transmission gratings", Applied Optics, Mar. 1, 1991, vol. 30; No. 7, pp. 807-814.
Golub et al., "Bragg properties of efficient surface relief gratings in the resonance domain", Optics Communications, Feb. 24, 2004, vol. 235, pp. 261-267, doi: 10.1016/j.optcom.2004.02.069.
Moharam et al., "Diffraction characteristics of photoresist surface-relief gratings", Applied Optics, Sep. 15, 1984, vol. 23, pp. 3214-3220.
Sabel et al., "Simultaneous formation of holographic surface relief gratings and volume phase gratings in photosensitive polymer", Materials Research Letters, May 30, 2019, vol. 7, No. 10, pp. 405-411, doi: 10.1080/21663831.2019.1621956.
Sakhno et al., "Deep surface relief grating in azobenzene-containing materials using a low-intensity 532 nm laser", Optical Materials: X, Jan. 23, 2019, 100006, pp. 3-7, doi: 10.1016/j.omx.2019.100006.
Tondiglia et al., "Holographic Formation of Electro-Optical Polymer±Liquid Crystal Photonic Crystals", Advanced Materials, 2002, Published Online Nov. 8, 2001, vol. 14, No. 3, pp. 187-191.
Yokomori, "Dielectric surface-relief gratings with high diffraction efficiency", Applied Optics, Jul. 15, 1984, vol. 23; No. 14, pp. 2303-2310.
International Search Report and Written Opinion for International Application No. PCT/US2020/048590, Search completed Dec. 7, 2020, dated Jan. 11, 2021, 19 Pgs3.
Bhuvaneshwaran et al., "Spectral response of Bragg gratings in multimode polymer waveguides", Applied Optics, Dec. 1, 2017, vol. 56. No. 34, pp. 9573-9582, doi: 10.1364/AO.56.009573.
Caputo et al., "POLICRYPS: a liquid crystal composed nano/microstructure with a wide range of optical and electro-optical applications", Journal of Optics A: Pure and Applied Optics, Jan. 15, 2009, vol. 11, No. 2, 13 pgs., doi:10.1088/1464-4258/11/2/024017.
Carothers, "Polymers and polyfunctionality", Transactions of the Faraday Society, 1936, vol. 32, pp. 39-49.
Doolittle, "Studies in Newtonian Flow. II. The Dependence of the Viscosity of Liquids on Free-Space", Journal of Applied Physics, 1951, vol. 22, Issue 12, pp. 1471-1475, published online Apr. 29, 2004, https://doi.org/10.1063/1.1699894.
Escuti et al., "Holographic photonic crystals", Society of Photo-Optical Instrumentation Engineers, Sep. 2004, vol. 43, No. 9, pp. 1973-1987, DOI: 10.1117/1.1773773.
Flory, "Molecular size distribution in three-dimensional polymers. I. Gelation", J. Am. Chem. Soc., Nov. 1941, vol. 63, pp. 3083-3090.
Guo et al., "Analysis of the effects of viscosity, volume and temperature in photopolymer material for holographic applications", Proc. SPIE, May 2013, vol. 8776, pp. 87760J-1-87760-J15, DOI:10.1117/12.2018330.
Kwon et al., "Polymer waveguide notch filter using two stacked thermooptic long-period gratings", IEEE Photonics Technology Letters, Apr. 4, 2005, vol. 17, Issue 4, pp. 792-794, DOI: 10.1109/LPT.2005.844008.
Li et al., "A low cost, label-free biosensor based on a novel double-sided grating waveguide coupler with sub-surface cavities", Sensors and Actuators B: Chemical, Jan. 2015, vol. 206, pp. 371-380, https://doi.org/10.1016/j.snb.2014.09.065.
Lougnot et al., "Polymers for holographic recording: VI. Some basic ideas for modelling the kinetics of the recording process", Pure and Applied Optics: Journal of the European Optical Society Part A, 1997, vol. 6, No. 2, pp. 225-245, https://doi.org/10.1088/0963-9659/6/2/007.
Missinne et al., "Flexible thin polymer waveguide Bragg grating sensor foils for strain sensing", Proc. SPIE, 10101, Organic Photonic Materials and Devices, Feb. 16, 2017, https://doi.org/10.1117/12.2250823.
Nielsen et al., "Grating Couplers for Fiber-to-Fiber Characterizations of Stand-Alone Dielectric Loaded Surface Plasmon Waveguide Components", Journal of Lightwave Technology, Oct. 1, 2012, vol. 30, No. 19, pp. 3118-3125, DOI: 10.1109/JLT.2012.2212418.
Pierantoni et al., "Efficient modeling of 3-D photonic crystals for integrated optical devices", IEEE Photonics Technology Letters, Feb. 2006, vol. 18, No. 2, pp. 319-321, DOI: 10.1109/LPT.2005.861991.

(56) References Cited

OTHER PUBLICATIONS

Pogue et al., "Electrically Switchable Bragg Gratings from Liquid Crystal/Polymer Composites", Applied Spectroscopy, 2000, vol. 54, Issue 1, pp. 12A-28A.

Prokop et al., "Air-Suspended SU-8 Polymer Waveguide Grating Couplers", Journal of Lightwave Technology, Sep. 1, 2016, vol. 34, No. 17, pp. 3966-3971, DOI: 10.1109/JLT.2016.2593025.

Sutherland et al., "Phenomenological model of anisotropic volume hologram formation in liquid-crystal-photopolymer mixtures", Journal of Applied Physics, Jun. 30, 2004, vol. 96, No. 2, https://doi.org/10.1063/1.1762713.

Waldern et al., "Waveguide Optics for All Day Wearable Displays", Jun. 20, 2017, 35 pgs.

Zeller et al., "Laminated Air Structured and Fluid Infiltrated Polymer Waveguides", in IEEE Photonics Technology Letters, Nov. 2, 2011, vol. 23, Issue: 21, pp. 1564-1566, first published Aug. 12, 2011, DOI: 10.1109/LPT.2011.2164396.

Zhao et al., "Diffusion Model of Hologram Formation in Dry Photopolymer Materials", Journal of Modern Optics, 1994. vol. 41, No. 10, pp. 1929-1939, https://doi.org/10.1080/09500349414551831.

Zhao et al., "Extension of a diffusion model for holographic photopolymers", Journal of Modern Optics, 1995, vol. 42, No. 12, pp. 2571-2573, https://doi.org/10.1080/713824349.

\* cited by examiner

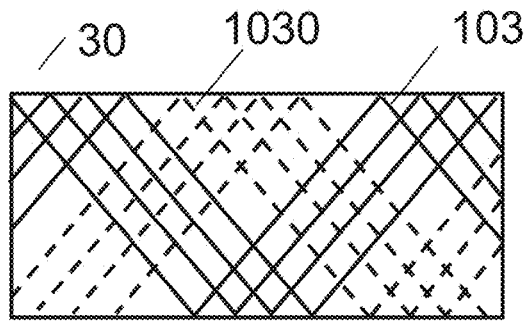
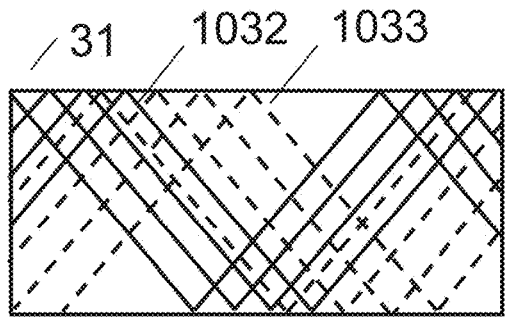
FIG.4A  FIG.4B
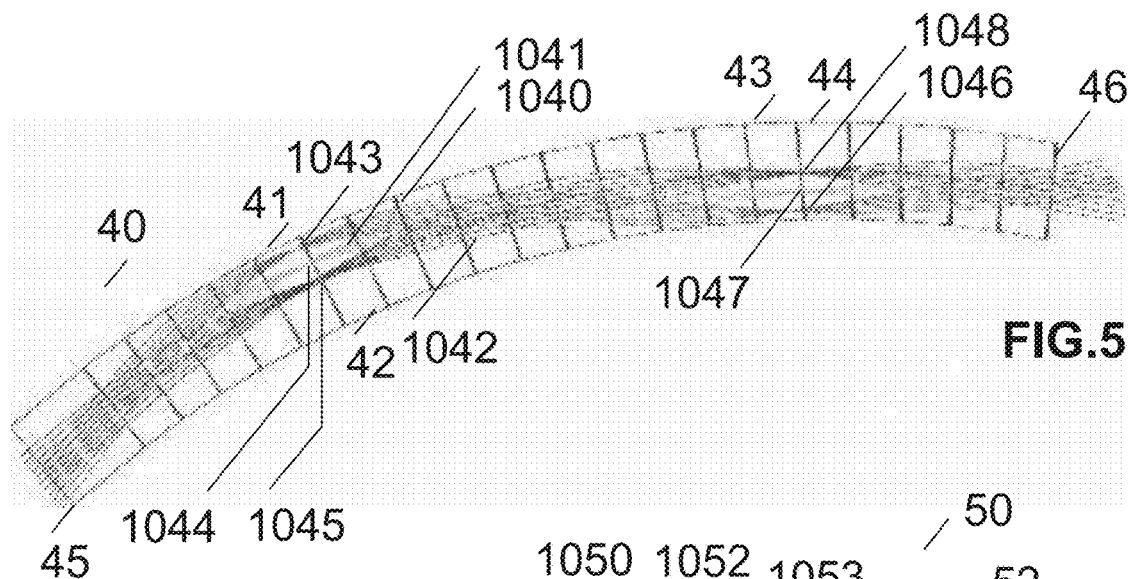
FIG.5
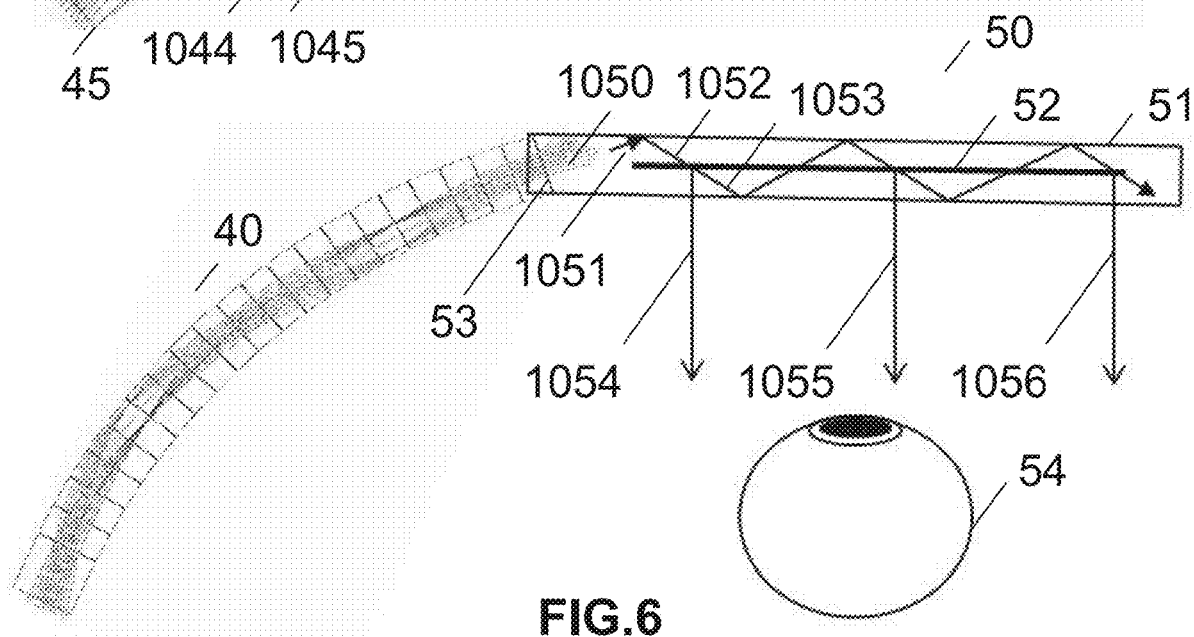
FIG.6

ENVIRONMENTALLY ISOLATED WAVEGUIDE DISPLAY

PRIORITY CLAIMS

This application is a continuation of U.S. patent application Ser. No. 15/543,016, entitled "Environmentally Isolated Waveguide Display" to Popovich et al, filed Jul. 12, 2017, which is the U.S. National Phase of PCT Application No. PCT/GB2016/000005, entitled "Environmentally Isolated Waveguide Display" to Popovich et al, filed Jan. 12, 2016, which claims the benefit of U.S. Provisional Application No. 62/125,066, entitled "OPTICAL WAVEGUIDE DISPLAYS FOR INTEGRATION IN WINDOWS" to Waldern et al, filed Jan. 12, 2015, the disclosures of which are incorporated herein by reference in their entireties.

BACKGROUND OF THE INVENTION

This invention relates to a display device, and more particularly to a holographic optical waveguide display.

Optical waveguide devices are being developed for a range of display applications such as Head Mounted Displays (HMDs) and Heads Up Displays (HUDs). Another field of application of waveguides is in sensors such as eye trackers such as the ones disclosed in PCT Application No.: PCT/GB2014/000197 entitled HOLOGRAPHIC WAVEGUIDE EYE TRACKER by Popovich et al and finger print sensors such as the ones disclosed in PCT/GB2013/000005 entitled CONTACT IMAGE SENSOR USING SWITCHABLE BRAGG GRATINGS by Popovich et al. However, waveguide devices that use total internal reflection (TIR) to transmit image information suffer from the problem the beam propagation may be disturbed by damage to or contamination of the external waveguide surfaces by foreign materials. There is a requirement for a waveguide display in which image light propagated within the waveguide is isolated from the external environment.

SUMMARY OF THE INVENTION

It is a first object of the invention to provide a waveguide display in which image light propagated within the waveguide is isolated from the external environment.

The objects of the invention are achieved in one embodiment of the invention in which there is provided a waveguide display comprising: an input image generator providing image light projected over a field of view; a waveguide having first and second external surfaces; and at least one grating optically coupled to the waveguide for extracting light from the waveguide towards a viewer of the display.

The waveguide has a lateral refractive index variation between the external surfaces that prevents rays propagating within the waveguide from optically interacting with at least one of the external surfaces.

In one embodiment the waveguide contains a GRIN medium and the grating is disposed in proximity to one of the external surfaces.

In one embodiment the waveguide contains a GRIN medium, and the grating is disposed within the GRIN medium.

In one embodiment the waveguide contains a GRIN medium, and the grating is a surface relief structure formed on one of the external surfaces.

In one embodiment the waveguide comprises a first waveguide portion containing a GRIN medium abutting a second waveguide portion operating in TIR and containing at least one grating for extracting light from the second waveguide portion towards a viewer of the display.

In one embodiment the waveguide further comprises an input grating.

In one embodiment the waveguide is immersed in air.

In some embodiments the display provides a HUD, HMD or a light field display.

In some embodiments the waveguide is curved.

In some embodiments the waveguide comprises at least one GRIN waveguide portion optically coupled to at least one TIR waveguide portion, each the TIR waveguide portion containing at least one grating.

In one embodiment the waveguide comprises a stack of GRIN waveguides optically coupled to a stack of TIR waveguides, each the TIR waveguide containing at least one grating.

In one embodiment the waveguide is immersed in a low refractive index external medium and comprises a high refractive index core sandwiched by a low refractive index clad layer and at least one grating layer. TIR takes place between the interface of the core layer and the grating layer and the interface of the grating layer and the external medium.

In one embodiment the core and the grating layer have substantially same average refractive index.

In one embodiment the core has a refractive index greater than the grating layer average index.

In one embodiment the apparatus further comprises low refractive index layers overlaying at least one of the grating layer and the low refractive index clad layer.

In one embodiment the grating layer comprises a grating sandwiched by transparent substrates, the grating layer and the substrates having similar refractive indices.

In one embodiment the grating layer comprises an input grating and an extraction grating.

In some embodiments the display further comprises a beamsplitter layer.

In some embodiments the image light is collimated.

In some embodiments the grating is a Bragg Grating, a surface relief grating or a switchable Bragg grating recorded in a HPDLC material, a uniform modulation HPDLC material or a reverse mode HPDLC material.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

BRIEF DESCRIPTION OF THE DRAWINGS

FIG. 4A is a cross section view illustrating beam paths in a portion of a planar waveguide.

FIG. 4B is a cross section view illustrating beam paths in a portion of a curved waveguide.

FIG. 5 is a schematic plan view of a curved GRIN light guide comprising abutting GRIN elements in one embodiment.

FIG. 6 is a schematic plan view of a near eye displays comprising curved GRIN light guide and a planar holographic waveguide in one embodiment.

DETAILED DESCRIPTION OF THE INVENTION

The invention will now be further described by way of example only with reference to the accompanying drawings. It will apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories. Parts of the following description will be presented using terminology commonly employed by those skilled in the art of optical design. It should also be noted that in the following description of the invention repeated usage of the phrase "in one embodiment" does not necessarily refer to the same embodiment.

One known solution for conveying images down a waveguide without interference from surface contamination relies on Gradient Index (GRIN) optics. GRIN optics reproduces the optical properties of spherical lenses by gradual varying the refractive index of a material. In the most common application, GRIN fibers, the lens properties result from a radially varying index. Since the optical properties rely on the index distraction the input and output faces of a GRIN lens may be planar. GRIN lenses are manufactured by using various methods including neutron irradiation, chemical vapor deposition, ion exchange and partial polymerization, in which an organic monomer is partially polymerized using UV light at varying intensities. By precisely varying their refractive index, gradient index lenses are able to continuously bend light within the lens. This contrasts with conventional spherical lenses, which bend light only twice: when light meets the front surface of the lens and when it exits the back of the lens. Gradient index lenses can be positive (converging) or negative (diverging). GRIN lenses are capable of high quality imaging as demonstrated by their successful application in endoscopes.

Figure 1:
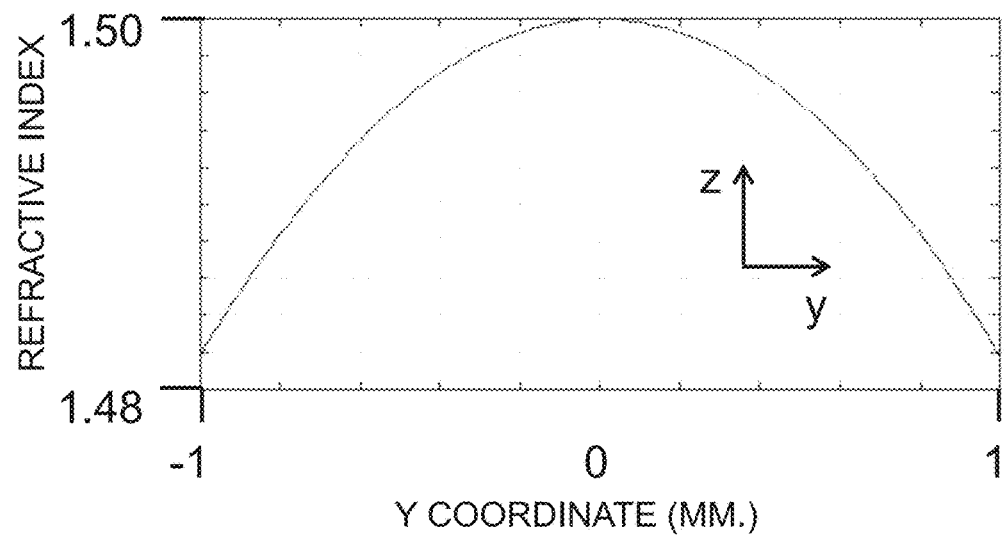
FIG. 1 is a chart illustrates the spatial variation of refractive index in a GRIN device.

FIG. 1 shows typical refractive index profile across a GRIN lens. The element has a thickness of 2 mm along the y-direction of the inset Cartesian coordinate frame (which will also apply to all of embodiments to be discussed below). The direction of beam propagation is in the z-direction. The refractive index of the GRIN varies from 1.46 to 1.5.

Figure 2:
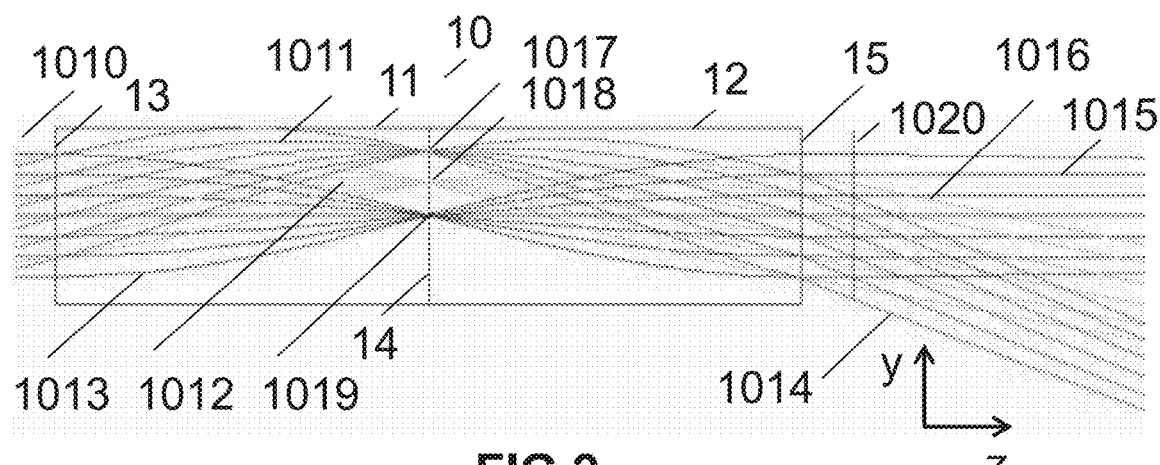
FIG. 2 is a schematic cross section view of a GRIN light guide operating at infinite conjugates and providing an intermediate focal plane in one embodiment.
Figure 3:
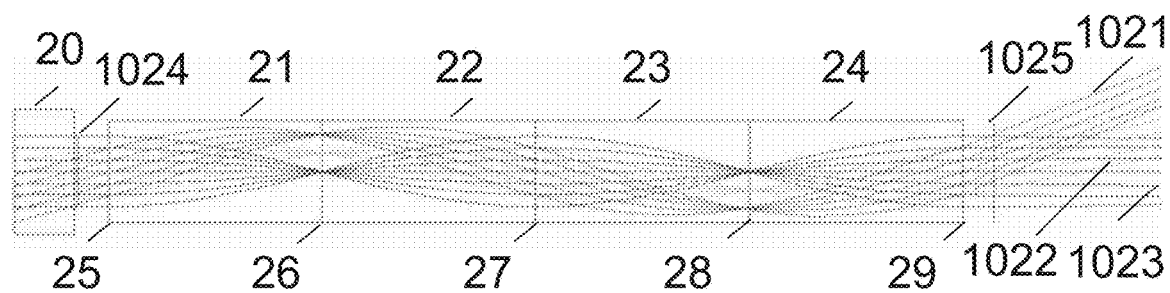
FIG. 3 is a schematic cross section view of a GRIN light guide operating at infinite conjugates and providing two conjugate intermediate focal planes in one embodiment.

FIG. 2 shows a GRIN lightguide 10 divided into two regions 11 and 12. The two regions may correspond to separate GRIN elements. The lightguide has an input surface 13 and intermediate focal plane 14 (which may correspond to the interface of two separate GRIN elements) and an output surface 15. Input collimated light 1010 having a field of view (FOV) is incident on the input surface. The GRIN focuses the light onto the intermediate focal plane such that the three beams illustrated, 1011-1013, form focal spots 1017-1019. The beams are then re-expanded in the second portion of the light guide and subsequently exit the light guide as the near-collimated beams 1014-1016 through the exit pupil 1020. From consideration of FIG. 2 it should be apparent that by applying the same optical principle it should be possible to engineer longer light guides containing more than one intermediate focal plane. FIG. 3, for example, shows how the embodiment of FIG. 2 may be extended to a light guide containing two intermediate focal planes. A beam collimator 20 provides collimated light 1024 over a FOV. The four GRIN regions 21-24 provide focal planes indicated by 26,28 with maximum beam expansion occurring at the planes 25,27,29. Three separate beam paths through the light guide are indicated by 1021-1023 with the entrance and exit pupils being indicated by 1024,1025.

To be of practical use in eye wear a GRIN lightguide should be curved in at least one plane of projection. In one embodiment the curvatures should match the profile of a spectacle lens. The inventors propose that the GRIN lightguide can be used to overcome the problem encountered when curved lightguide designs are attempted using total internal reflection (TIR) waveguides. The nature of the problem is illustrated in FIG. 4 which compares beam propagation in small sections of a planar waveguide (FIG. 4A) and a curved waveguide (FIG. 4B). The beams in the planar waveguide are well separated as shown by the illustrated beam paths 1030,1031. In the case of the curved waveguide element the beams paths are mixed leading to scrambling of the waveguide pupil. Unfortunately, the disorder cannot be corrected by modifying the curvatures of the waveguide surfaces. There may be some scope for compensation based in curving the input and output surfaces. However the number of optimisation degrees of freedom provided by the surface curvatures will be insufficient for most display applications.

FIG. 5 shows one embodiment of the invention in which a curved waveguide 40 comprises abutting or daisy-chaining GRIN elements. To achieve a smooth curve the input and output surfaces of the elements should have a small wedge angle (or may have parallel input and output surfaces but sandwich a wedge-shaped layer of index-matching material. Multiple focal surfaces are formed as in the embodiments of FIG. 3. Advantageously, the input is collimated and should fill the input pupil to fill the intermediate pupils within in and at the output of the waveguide. In some embodiments it may use non-collimated light.

In one embodiment shown in FIG. 6 the invention provides a near eye display 50 comprising a GRIN lightguide 40, identical to the one in FIG. 5, optically coupled to an image extraction waveguide 51 for directing the image light to the eye 53 of the viewer. In contrast to the GRIN light guide the image extraction waveguide transmits image light by total internal reflection (TIR) as indicated by the ray path 1051-1053. The waveguide essentially comprises a holographic grating 52 sandwiched between transparent optical substrates. The grating is lossy, that is, it has diffraction efficiency (DE) varying from a low value at the end of the grating nearest the GRIN lightguide to a high value at its other end. The effect of the varying DE is to provide uniform light extraction along the length of the grating thereby expanding the exit pupil or eyebox of the display as indicated by the rays 1054-1056. Coupling of the GRIN light guide and the waveguide may be accomplished in several different ways. In one embodiment the two devices are coupled end-to-end as indicated in FIG. 6. In this case it will be necessary to engineer a sharp bend to ensure that the entire angular image content 1050 emerging from the GRIN lightguide enters a TIR state in the waveguide. The lagging ray angle would need to be just above the TIR angle (>41.5 deg in glass). In another embodiment the required beam steering may be provide by a coupling prism. The disadvantage of this approach is that it would entails a step from the lightguide to the holographic waveguide. In another embodiment the prism may be replaced by a grating. The precise details of the coupling interface will depend on the application. For example, ergonomic constraints on the maximum bend, waveguide thickness, field of view and other parameters will have an impact on the relative ease of implements of the various solutions. In one embodiment the apparatus of FIG. 6 is embedded in one or both of the curved eyepieces of a pair of prescription glasses. In one embodiment the apparatus of FIG. 6 is embedded within curved, emmetropic (that is, zero prescription), eyewear such as sunglasses).

The image extraction waveguide in FIG. 6 may be based on a passive holographic technology. Alternatively, it may use switching grating technology such as Switchable Bragg Gratings (SBGs). The advantage of switching gratings is that they allow the field of view to be expanded using tiling. In the light of current waveguide fabrication limitations, it is likely the waveguide will be need to be a planar element. However, the invention is equally applicable to curved waveguides. The waveguide may be based on any of the holographic waveguide embodiments disclosed in U.S. Pat. No. 8,233,204 entitled OPTICAL DISPLAYS, U.S. patent application Ser. No. 13/844,456 entitled TRANSPARENT WAVEGUIDE DISPLAY, PCT Application No.: GB2012/000677 entitled WEARABLE DATA DISPLAY, U.S. patent application Ser. No. 13/317,468 entitled COMPACT EDGE ILLUMINATED EYEGLASS DISPLAY, U.S. patent application Ser. No. 13/869,866 entitled HOLOGRAPHIC WIDE ANGLE DISPLAY, and U.S. patent application Ser. No. 13/844,456 entitled TRANSPARENT WAVEGUIDE DISPLAY all of which are incorporated herein by reference in their entireties.

Holographic waveguides based on Switchable Bragg Gratings (SBGs). SBGs are fabricated by first placing a thin film of a mixture of photopolymerizable monomers and liquid crystal material between parallel glass plates. One or both glass plates support electrodes, typically transparent indium tin oxide films, for applying an electric field across the film. A volume phase grating is then recorded by illuminating the liquid material (often referred to as the syrup) with two mutually coherent laser beams, which interfere to form a slanted fringe grating structure. During the recording process, the monomers polymerize and the mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the film. When an electric field is applied to the grating via transparent electrodes, the natural orientation of the LC droplets is changed causing the refractive index modulation of the fringes to reduce and the hologram diffraction efficiency to drop to very low levels. Note that the diffraction efficiency of the device can be adjusted, by means of the applied voltage, over a continuous range. The device exhibits near 100% efficiency with no voltage applied and essentially zero efficiency with a sufficiently high voltage applied. In certain types of HPDLC devices magnetic fields may be used to control the LC orientation. In certain types of HPDLC phase separation of the LC material from the polymer may be accomplished to such a degree that no discernible droplet structure results. SBGs may be used to provide transmission or reflection gratings for free space applications. In waveguide applications the parallel glass plates used to form the HPDLC cell provide a total internal reflection (TIR) light guiding structure. Light is "coupled" out of the SBG when the switchable grating diffracts the light at an angle beyond the TIR condition. Typically, the HPDLC used in SBGs comprise liquid crystal (LC), monomers, photoinitiator dyes, and coinitiators. The mixture frequently includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. Both filings describe monomer and liquid crystal material combinations suitable for fabricating SBG devices.

One of the known attributes of transmission SBGs is that the LC molecules tend to align normal to the grating fringe planes. The effect of the LC molecule alignment is that transmission SBGs efficiently diffract P polarized light (ie light with the polarization vector in the plane of incidence) but have lower diffraction efficiency for S polarized light (ie light with the polarization vector normal to the plane of incidence.

The techniques for designing GRIN light guides should be well known to those skilled in the art and have been implemented in design software such as ZEMAX® (ZEMAX Development Corporation, Bellevue, Wash.). GRINs suitable for used with the invention are likely to require a polynomial profile which may also require additional odd-order polynomial terms to correct for the effects of lightguide curvature. Potential issues to be addressed in reducing the invention to practice include the limited number of degrees of freedom available for optimizing the design, the impact of curvature on aberrations, the tolerances of refractive index profile (and impact on relay functionality) and identifying the most efficient optical means for coupling the GRIN light guide to the image extraction waveguide In many practical embodiments the GRIN lightguide will have unity magnification. However, the invention does not assume any particular magnification. In one embodiment at least one change in magnification is provided along the light guide.

Figure 7:
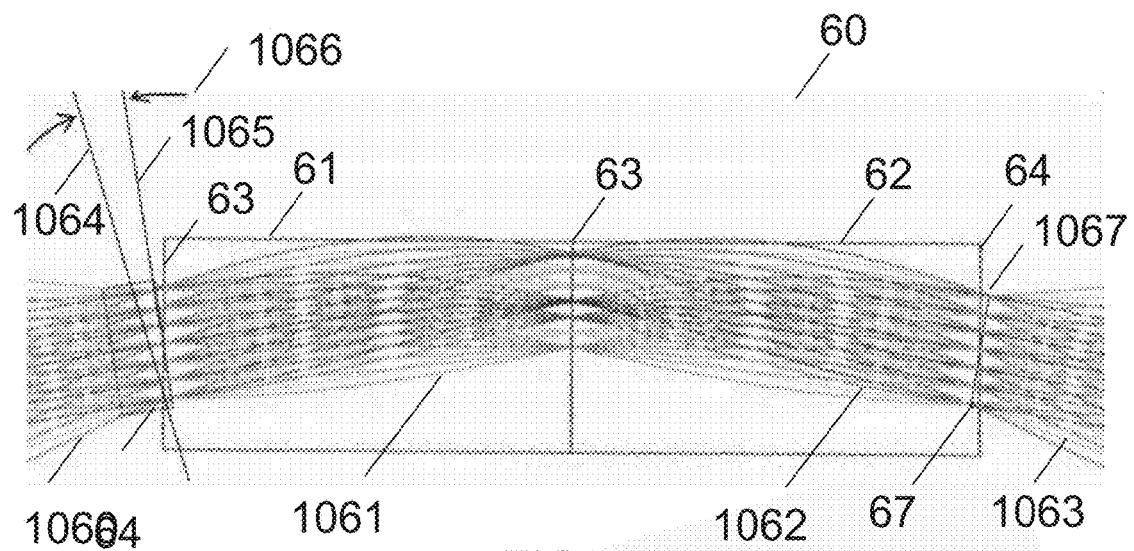
FIG. 7 is a schematic view of a further embodiment of the invention.

In one embodiment illustrated in FIG. 7 there is provided an afocal cylindrical GRIN waveguide element 60 suitable for use in a curved waveguide. The element comprises the back to back elements 61 and 62 which share a focal surface 63. The input and output surfaces of the waveguide element are indicated by 63, 64. In practice the input and output surfaces will be wedged to give the input and output surfaces 65,67 where 65 is the output surface of the refractive element 66. In the particular embodiment illustrated the tilt angle will be equivalent to a field angle of ±15 degrees in air or ±9.48 degrees in glass. The tilt angle applied to each end of the waveguide matches the half field angles of the transmitted image, that is, the maximum design angles that can be transmitted by the waveguide. It should be apparent from consideration of the drawing that the relay therefore has a magnification of exactly unity. The positive field angles entering the relay exactly match the negative field angles at the re-imaged pupil. It should also be apparent that elements of the type illustrated can be daisy-chained to yield a progressing curve shape with the tilted surfaces 65,67 providing the interfaces between adjacent waveguide elements. Typically, a straight GRIN element would use a form such as $n(x)=A_0+A_2x^2+A_4x^4+A_6x^6$. Odd terms are added to this expression when tilt is introduced. At the above stated angles the wavefront errors are found to be negligible. Typically, the GRIN refractive index variation centre to edge is around 0.12.

Figure 8:
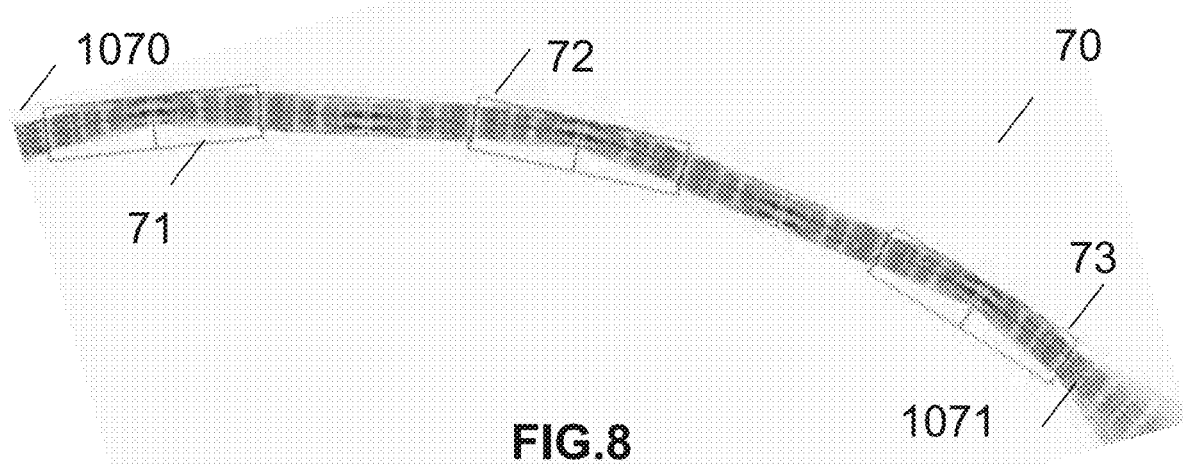
FIG. 8 is a schematic view of a further embodiment of the invention.
Figure 9:
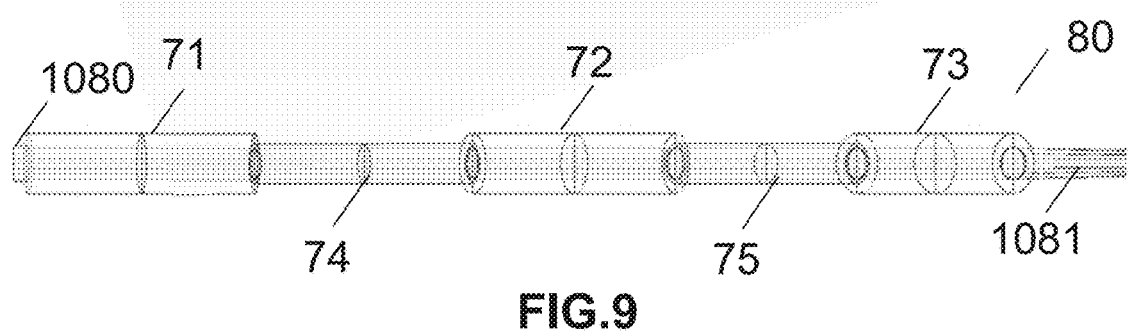
FIG. 9 is a schematic view of a further embodiment of the invention.

In the embodiment of FIG. 8 there is provided a waveguide based on the element shown in FIG. 7. Three such elements 70-72 are separated by intermediate, substantially afocal GRIN waveguides 74,75 of a second prescription. Collimated input 1070 and output 1071 light is shown. The approximate dimensions of the complete waveguide are 68 mm horizontal by 36.5 mm. vertical. The waveguide is approximately 3 mm. thick. The collimated output light emerging from the end of the waveguide may be coupled in a grating waveguide for image extraction. The waveguide is shown in side projection in FIG. 9.

Figure 10:
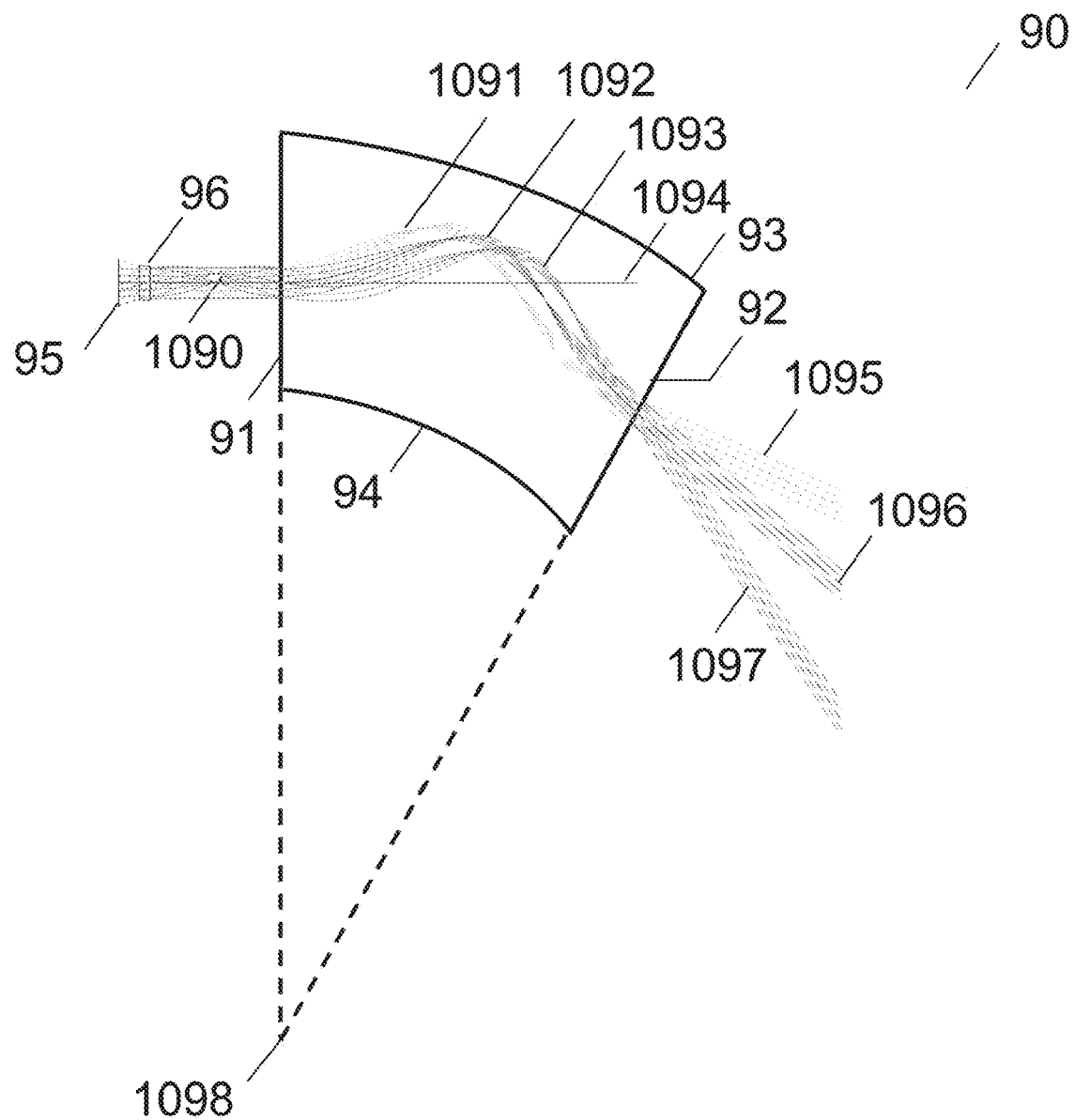
FIG. 10 is a schematic view of a further embodiment of the invention.

In the embodiment shown in FIG. 10 the GRIN prescription comprises an even polynomial up to sixth order coefficients, a radial offset term and a GRIN input tilt term. The latter is effectively an offset to the radial centre of rotation labelled by 1098. It should be noted that this relay lens contains two internal focus points. The first of these focus points is formed as the light TIRs within the waveguide. The relay is symmetrical about the line bisection the extended input and output surfaces 91,92 in the plane of the drawing. In general, the detailed design of a GRIN waveguide must take into account skew rays, dispersion, number of GRIN index steps. Moreover, the GRIN must be manufactured to tight tolerances. Errors in the waveguide length would result in the output beams being imprecisely collimated. Tolerances of this nature could be mitigated either by focus adjustment on the input beam or by trimming the waveguide to the specific length required.

Figure 11:
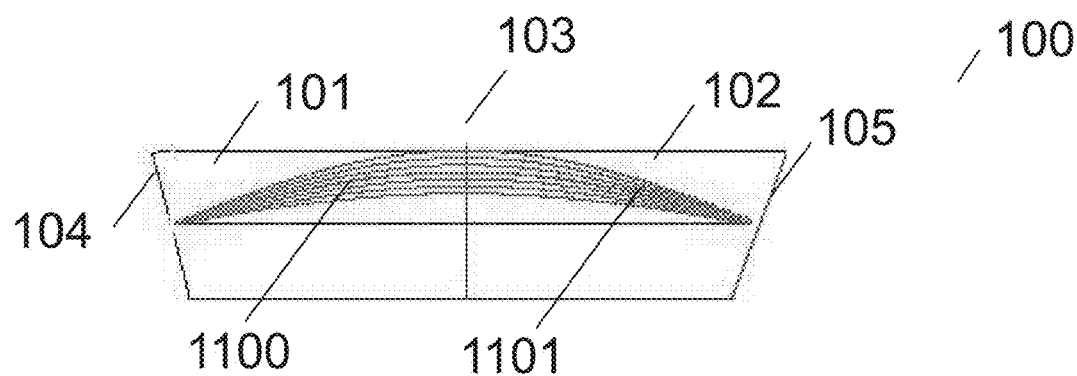
FIG. 11 is a schematic view of a further embodiment of the invention.
Figure 12:
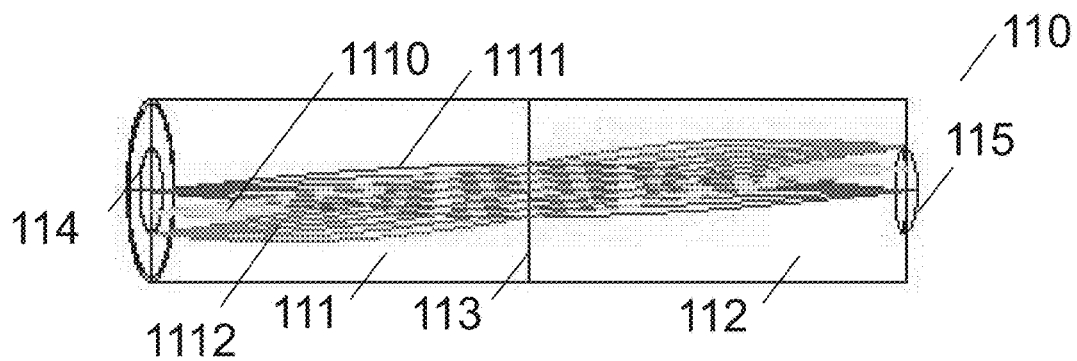
FIG. 12 is a schematic view of a further embodiment of the invention.

In the embodiment of FIG. 11 a GRIN waveguide 100 provides finite conjugate 1:1 image imaging between the tilt surfaces 104,105. The waveguide may be divided into the two symmetrical portions 101,102 abutting at the surface 103 where the beam is substantially collimated. The ray paths for one pair of conjugate points are indication by 1100,1101. The waveguide is shown in plan view 110 on FIG. 12. Here a small ±2 mm. pupil relay is shown. Note that the relayed surfaces 114,115 are non planar. This pupil aberration does not need to be corrected in the case of a 1:1 relay because it is arranged to be symmetrical about the stop at the surface 103. Three beams 1110-1112 are illustrated.

Figure 13:
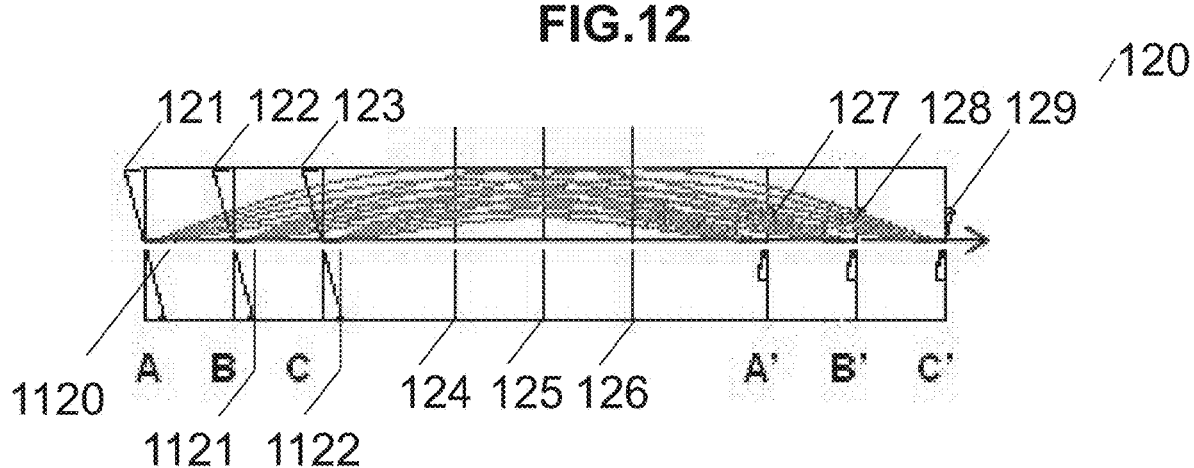
FIG. 13 is a schematic view of a further embodiment of the invention.
Figure 14A:
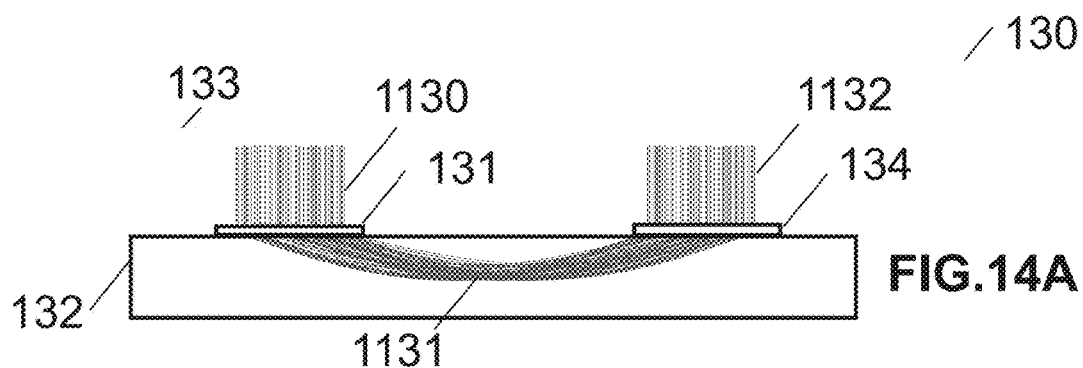
FIG. 14A is a schematic view of a further embodiment of the invention.
Figure 14B:
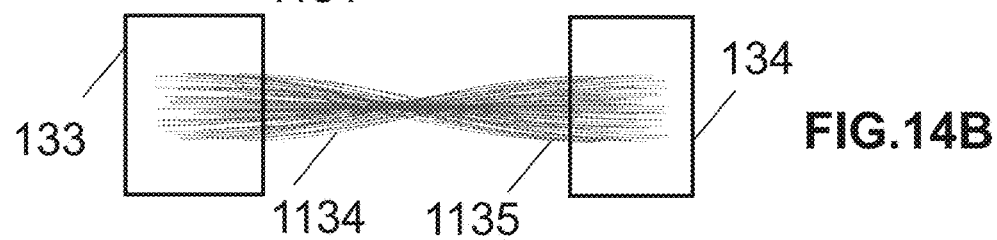
FIG. 14B is a schematic view of a further embodiment of the invention.

In one embodiment there is provided a waveguide suitable This is illustrated in FIG. 13 which shows a waveguide 120 for propagating beams from a multiplicity of points labelled by symbols A-C to a multiplicity of points labelled by the symbols A'-C' Note that the GRIN profile is radial; there is no index variation and hence the image relay process is invariant along the axis of propagation. The GRIN prescription contains the series of tilt surfaces labelled by numerals 121-129. In one embodiment the tilts are symmetrical about the surface 125. Beam paths 1120-1122 from the points A-C to A'-C' are illustrated. Only the upper half of the GRIN is used. Hence referring to the reference plane 1123 the points A-C could correspond to a first image plane and the points A'-C' are light in proximity to a grating layer for extracting light from the waveguide. An example of grating coupling to an from a GRIN waveguide is provided by the embodiment of FIG. 14 which shows a GRIN waveguide 130 immersed in air 131, comprising a GRIN waveguide 132 similar in concept to the one of FIG. 13, an input grating 133 and an output grating 134. The input and output gratings are design from 0 degrees in air coupling to 75 degrees in glass. Referring to FIG. 14A, the input beam is indicated by 1130, the GRIN guided light by the rays 1131 and the output light by 1132. FIG. 14B is a plan view of the ray trace showing the GRIN-guided beam paths 1134,1135.

Figure 15:
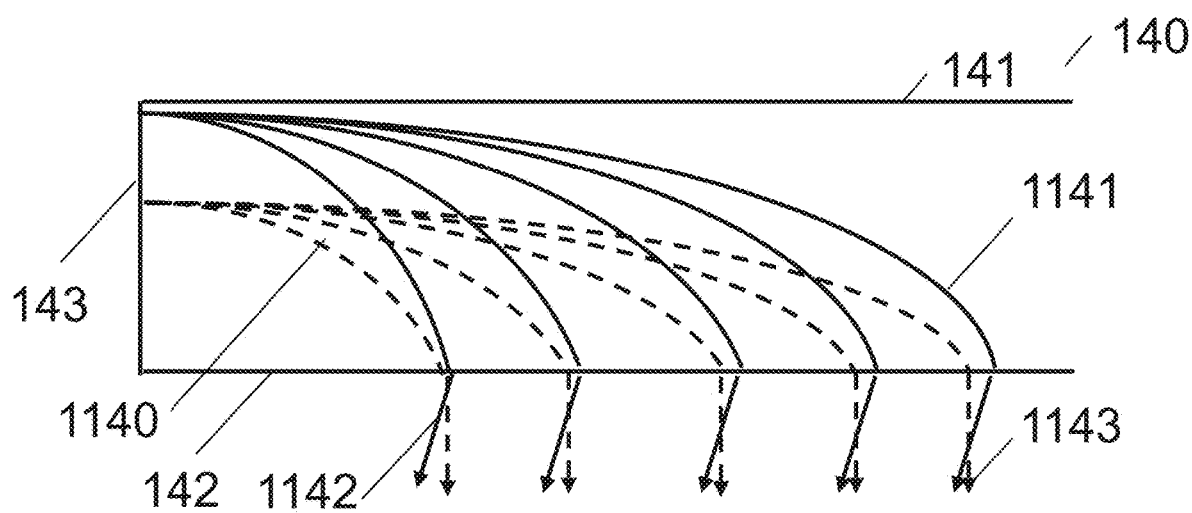
FIG. 15 is a schematic side view of a GRIN waveguide in embodiment of the invention.

We next consider a series of GRIN waveguide embodiments using gratings to extract collimate image light from the waveguide over a specified field of view. In the embodiment of FIG. 15 a GRIN waveguide 140 comprises a planar GRIN substrate 141 having an output surface 142 and an input surface 143 which is also an intermediate focal surface. First and second ray paths through the GRIN medium are generally indicated by 1140 and 1141. The collimated light beams refract out of the output surface as generally indicated by 1142,1143.

Figure 16:
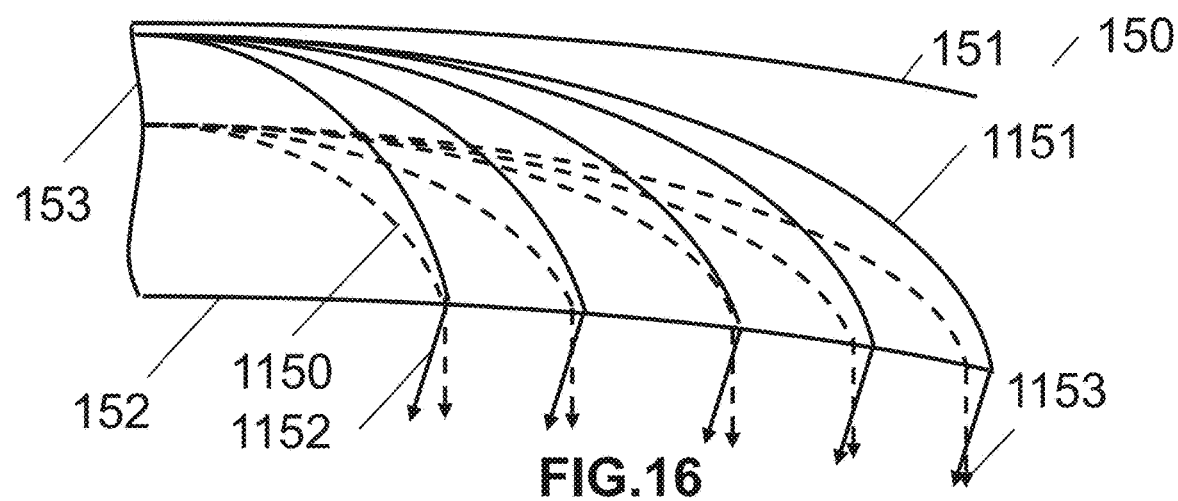
FIG. 16 is a schematic side view of a GRIN waveguide in embodiment of the invention.

In the embodiment of FIG. 16 a GRIN waveguide 150 comprises a curved GRIN substrate 151 having a curved output surface 152 and a curved input surface 153 which is also an intermediate focal surface. First and second ray paths through the GRIN medium are generally indicated by 1150 and 1151. The collimated light beams refract out of the output surface as generally indicated by 1152,1153.

Figure 17:
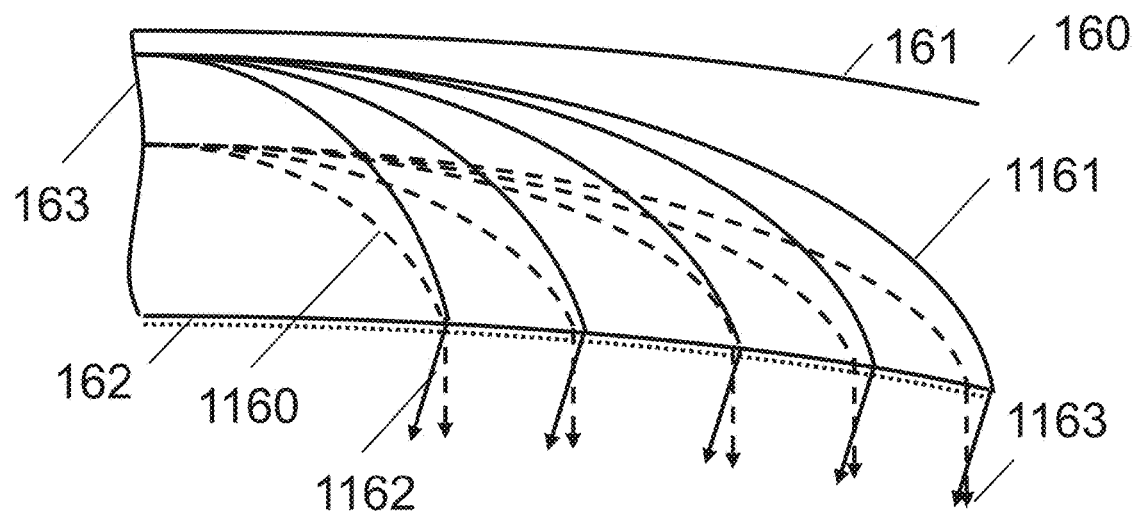
FIG. 17 is a schematic side view of a GRIN waveguide in embodiment of the invention.

In the embodiment of FIG. 17 a GRIN waveguide 160 comprises a curved GRIN substrate 161 having a curved output surface 162 which has the form of a surface relief grating, and a curved input surface 163 which is also an intermediate focal surface. First and second ray paths through the GRIN medium are generally indicated by 1160 and 1161. The collimated light beams refract out of the output surface as generally indicated by 1162,1163.

Figure 18:
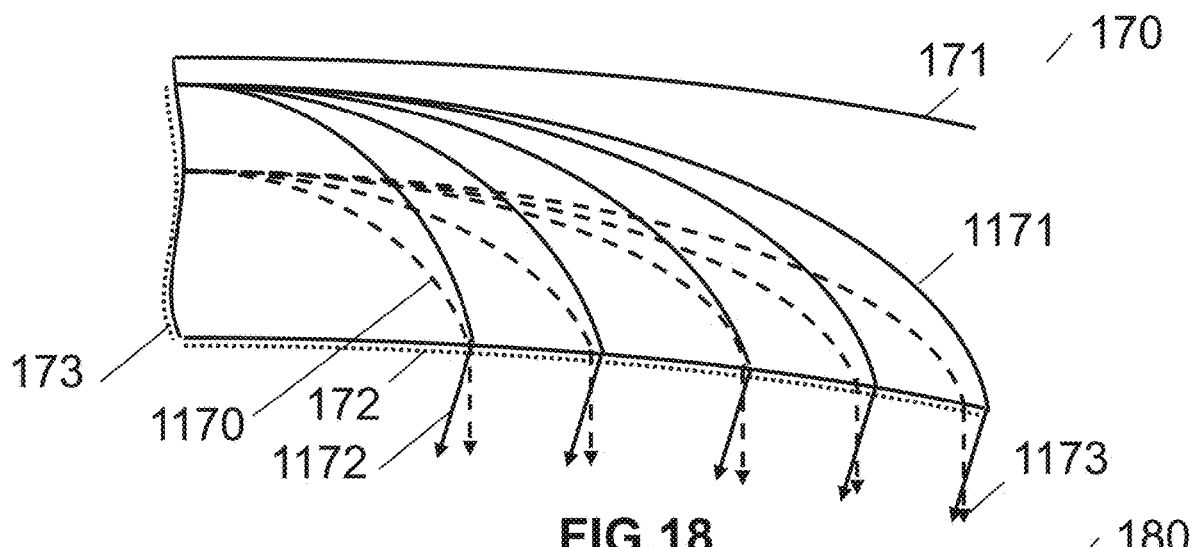
FIG. 18 is a schematic side view of a GRIN waveguide in embodiment of the invention.

In the embodiment of FIG. 18 a GRIN waveguide 170 comprises a curved GRIN substrate 171 having a curved output surface 172 which has the form of a surface relief grating, and a curved input surface 173, which has the form of a surface relief grating and which is also an intermediate focal surface. First and second ray paths through the GRIN medium are generally indicated by 1170 and 1171. The collimated light beams refract out of the output surface as generally indicated by 1172,1173.

Figure 19:
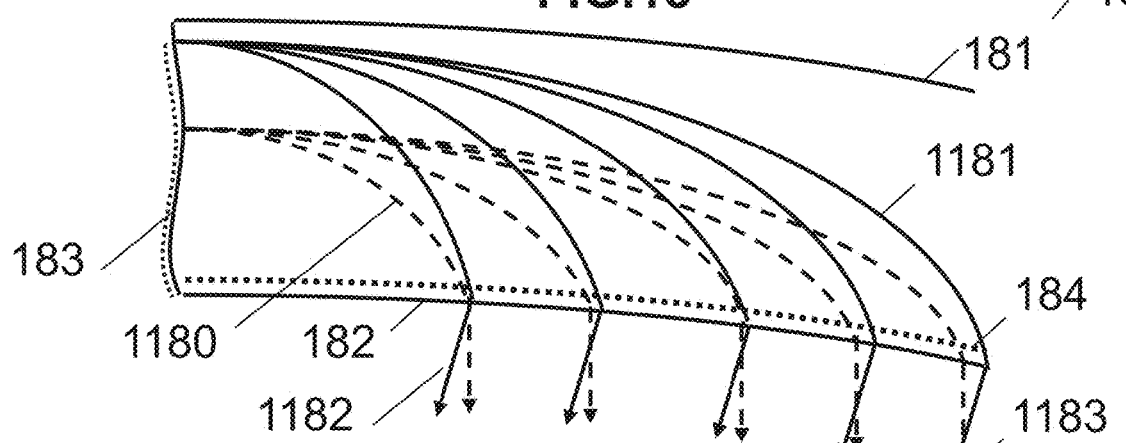
FIG. 19 is a schematic side view of a GRIN waveguide in embodiment of the invention.

In the embodiment of FIG. 19 a GRIN waveguide 180 comprises a curved GRIN substrate 181 having a curved output surface 182 and a curved input surface 183 which has the form of a surface relief grating and which is also an intermediate focal surface. A curved grating 184 is disposed inside the waveguide in proximity to the output surface. In one embodiment the grating is a volume or Bragg grating. In one embodiment the grating is a SBG. First and second ray paths through the GRIN medium are generally indicated by 1180 and 1181. The collimated light beams refract out of the output surface as generally indicated by 1182,1183.

Figure 20:
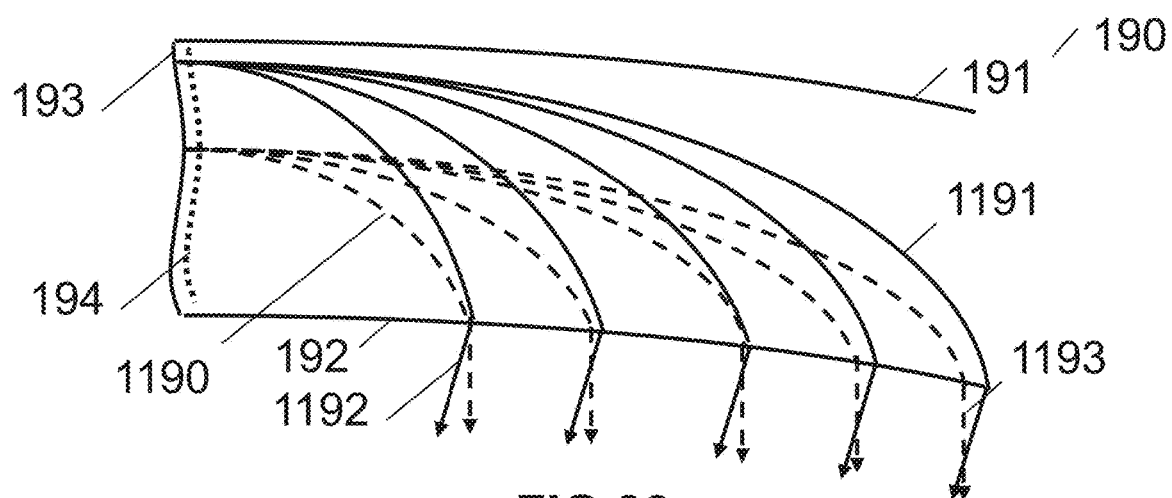
FIG. 20 is a schematic side view of a GRIN waveguide in embodiment of the invention.

In the embodiment of FIG. 20 a GRIN waveguide 190 comprises a curved GRIN substrate 191 having a curved output surface 192 and a curved input surface 133 which is also an intermediate focal surface. A curved grating 194 is disposed inside the waveguide in proximity to the input surface. In one embodiment the grating is a volume or Bragg grating. In one embodiment the grating is a SBG. First and second ray paths through the GRIN medium are generally indicated by 1190 and 1191. The collimated light beams refract out of the output surface as generally indicated by 1192,1193.

It should be apparent from consideration of the preceding embodiments of FIGS. 15-20 that other embodiments may be devised for the purposes of extracting collimate image light from the waveguide over a specified field of view by using different combinations of curved surfaces and gratings. In some cases multiple layers of gratings may be used for the purposes of increasing the field of view and propagating red green and blue image content according to the teaching of the above-cited related patent applications.

Figure 21:
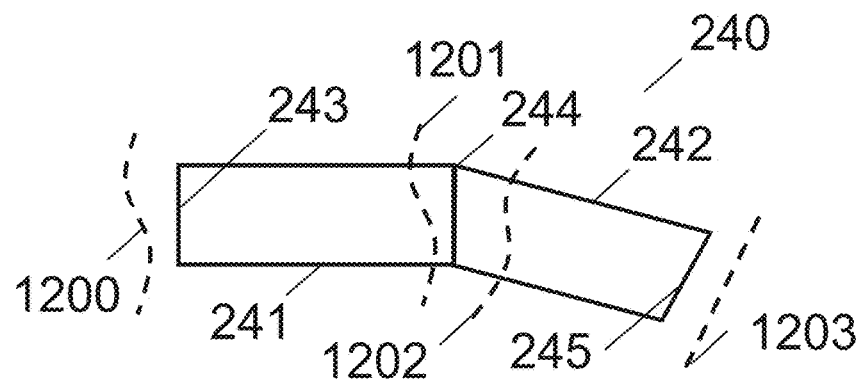
FIG. 21 is a schematic side view of an aberration-correcting GRIN waveguide in embodiment of the invention.

In one embodiment illustrated in FIG. 21 a waveguide comprises two GRIN waveguide elements arrange in series in which the second element corrects the aberrations of the input image light. The input image light, which is represented by the curved wavefront 1200, propagates down the first waveguide element 241 forming a wavefront 1201 in proximity to the boundary surface 244. After refraction through the boundary surface the refracted wavefront 1202 propagates through the second waveguide element and is refracted out of the waveguides as the planar wave 1203.

Figure 22:
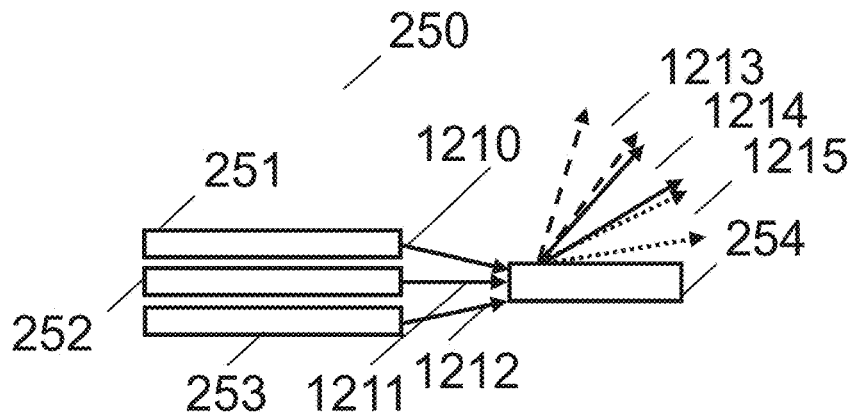
FIG. 22 is a block diagram of an architecture for coupling GRIN waveguides to an image extraction grating waveguide in one embodiment.

In one embodiment there is provided a general waveguide architecture which is schematically illustrated by the block diagram of FIG. 22. The GRIN waveguides 251-253 are coupled into a waveguide 254 containing an image extraction grating by coupling means symbolically indicated by 1210-1212. The output from the image extraction waveguide comprises collimated light in the field of view regions or tiles labelled 1213-1215. The coupling means are base on the teachings of the above described embodiments.

Figure 23:
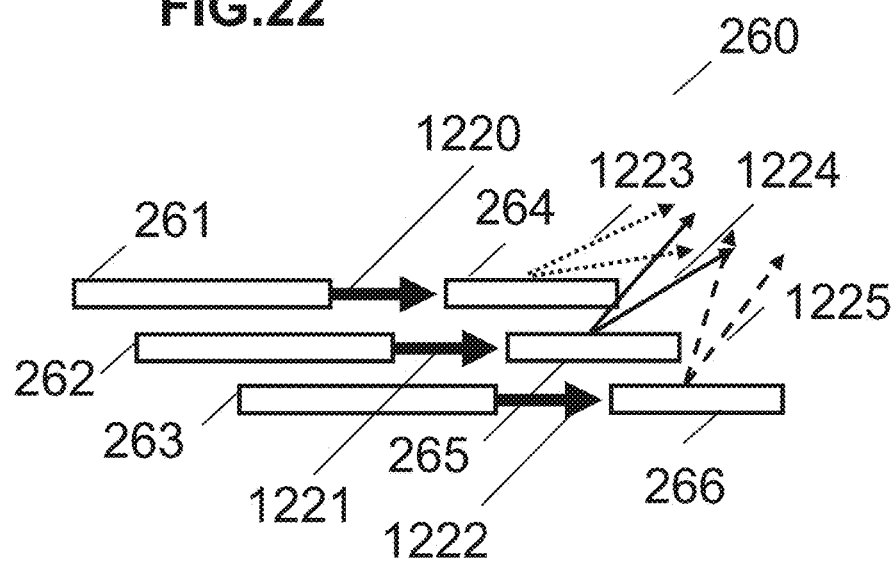
FIG. 23 is a block diagram of an architecture for coupling GRIN waveguides to an image extraction grating waveguide in one embodiment.

In one embodiment there is provided a general waveguide architecture which is schematically illustrated by the block diagram of FIG. 23. The GRIN waveguides 261-262 are coupled into waveguides 264-266 each containing an image extraction grating by coupling means symbolically indicated by 1220-1222. The output from the image extraction waveguide comprises collimated light in the field of view regions or tiles labelled 1223-1225.

Figure 24:
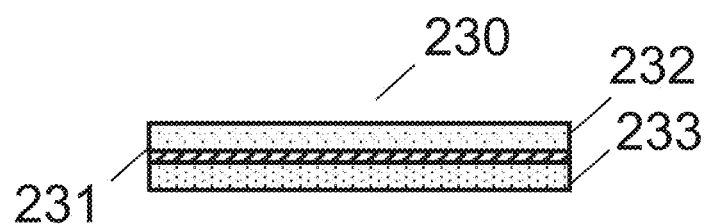
FIG. 24 is a waveguide comprising a grating layer sandwiched by GRIN layers in one embodiment.

In one embodiment illustrated in FIG. 24 there is provided a waveguide 230 comprising at least one grating layer 231 sandwiched by first and second GRIN layers 231,232. In one embodiment the grating is a volume or Bragg grating. In one embodiment the grating is a SBG.

Figure 25:
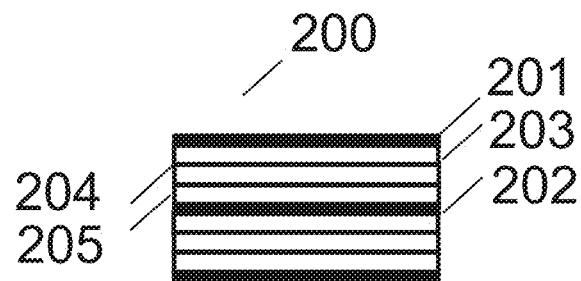
FIG. 25 is a waveguide architecture using GRINs recorded in HPDLC in one embodiment.

In one embodiment illustrated in FIG. 25 there is provided a waveguide 200 comprising GRIN layers formed in a HPDLC material sandwiched by transparent electrodes. In the example shown the electrodes layers 201,202 sandwich the stack of GRIN layers 201-203.

Figure 26:
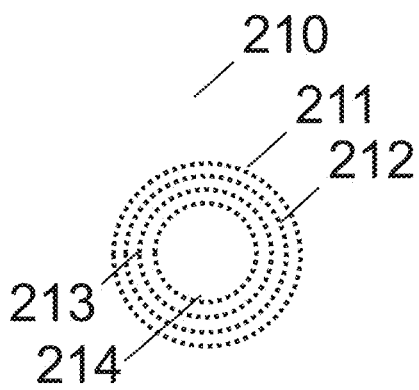
FIG. 26 is a GRIN device comprising concentric annular GRIN layers in one embodiment.

In one embodiment illustrated in FIG. 26 a GRIN structure 210 comprises cylindrical concentric GRIN layers 211-214. The structure may be trimmed to form curved substrates or lens elements.

Figure 27:
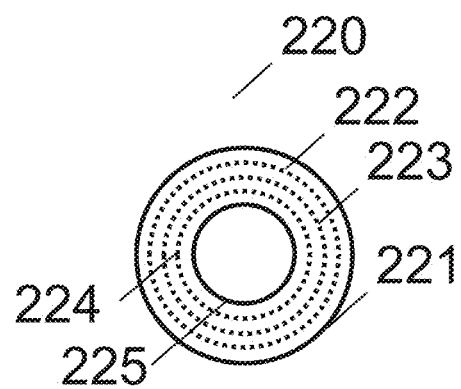
FIG. 27 is a GRIN device comprising concentric annular GRIN layers recorded in HPDLC in one embodiment.

In one embodiment illustrated in FIG. 27 a GRIN structure 220 comprises cylindrical concentric GRIN layers 222-224 sandwiched by transparent electrodes 221,225 The structure may be trimmed to form curved substrates or lens elements.

In one embodiment of the invention the refractive index of the GRIN varies radially and along the length of the waveguide.

GRIN waveguides several key advantages over TIR waveguides as used in the above-cited related patent applications. The first one is the GRIN eliminates the problem of banding. A major design challenge in waveguide optics is coupling the image content into the waveguide efficiently and in such a way the waveguide image is free from chromatic dispersion and brightness non uniformity. To overcome chromatic dispersion and to achieve the best possible collimation it is desirable to use lasers. However, lasers and other narrow band sources such as LEDs suffer from the problem of pupil banding artifacts which manifest themselves as output illumination non uniformity. Banding artifacts are formed when the collimated pupil is replicated (expanded) in a TIR waveguide. In very basic terms the light beams diffracted out of the waveguide each time the beam interacts with the grating have gaps or overlaps. This leads to an illumination ripple. The degree of ripple is a function of field angle, waveguide thickness, and aperture thickness. The effects are therefore most noticed in narrowband (e.g. laser) illumination sources. Banding can be smoothed by dispersion with broadband sources such as LEDs. However, current LEDs do not provide enough light output for waveguide displays. A second major benefit of GRIN waveguides is that the guided beams do not interact with the faces of the waveguide making the waveguides immune to external contaminants. Additional optical layers may be applied without interfering with the waveguiding. The third major benefit of GRIN is that curved waveguides can be engineered much more easily than with TIR waveguides.

Notwithstanding the above advantages of GRINs, in many applications a similar degree of protection may be provided by using a protective cladding applied to an exterior surface of the waveguide. Examples of such embodiments of the invention are shown in FIGS. 28-31. In each case the lower surface of the waveguide is nearest the viewer of the display and is in contact with air. In each case the uppermost layer isolates the TIR from the effects of windscreen damage or contamination and allows additional coatings to be applied to the exterior surface if required. In general, a waveguide must have a core of high index sandwiched by lower index (clad) layers, one of which may be air. However, if the TIR angles in the core are large enough low index refractive materials may be used.

Figure 28:
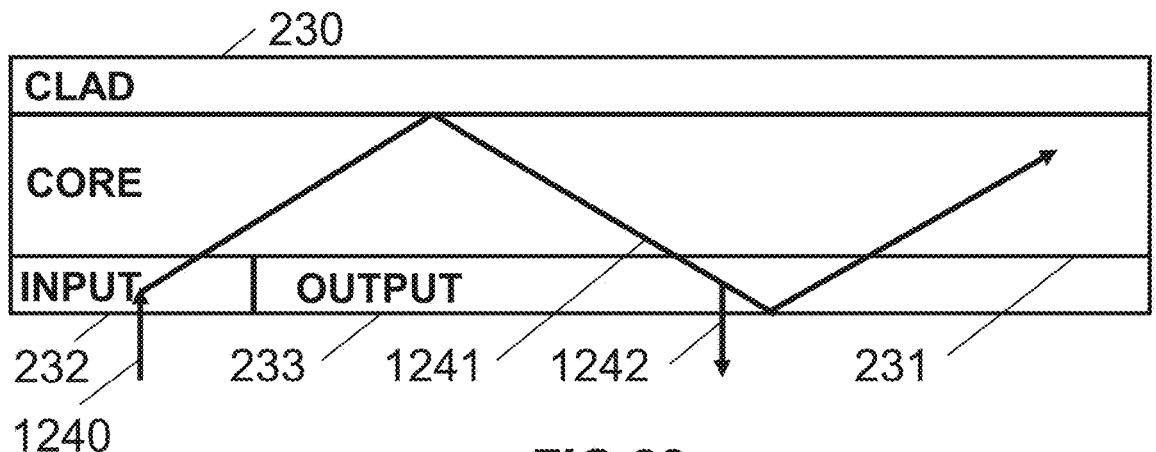
FIG. 28 is a section of a TIR waveguide device with an external protective layer in one embodiment.

In the embodiment shown in FIG. 28 the display comprises the external clad layer 230, providing a protective layer, a core layer 231 and a grating layer divided into an input grating 232 and a lossy output grating 233 which extracts light uniformly along the waveguide to provide an expanding exit pupil. The grating layer has an average refractive index substantially identical to that of the core. A typical ray path 1240-1242 is shown. An input ray is coupled into a TIR path inside the waveguide by the input grating and is eventually coupled out of the waveguide by the output grating.

Figure 29:
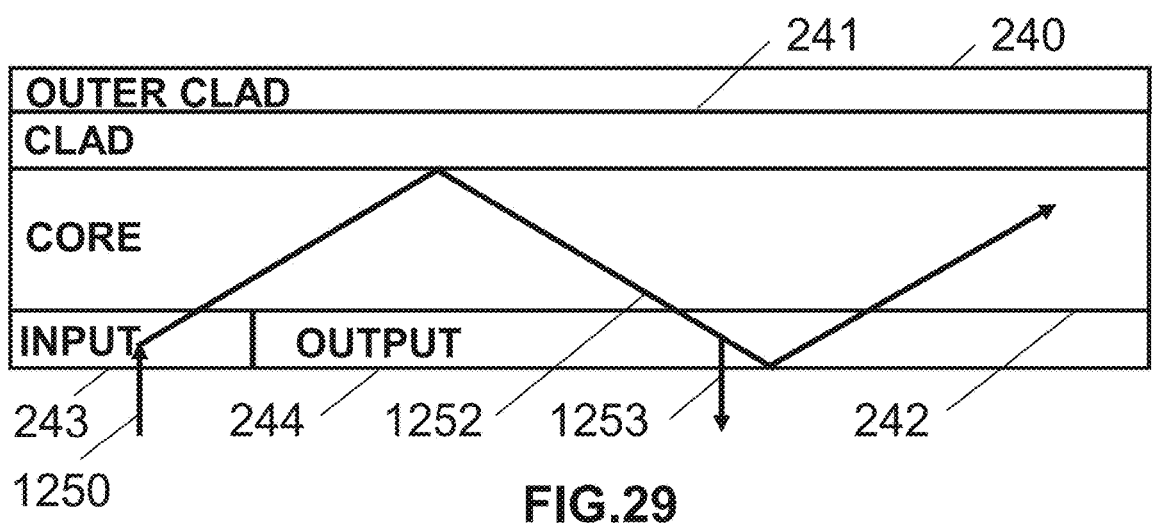
FIG. 29 is a section of a TIR waveguide device with an external protective layer in one embodiment.

The embodiment of FIG. 29 is identical to the one of FIG. 28 but with an additional outer clad layer. Note this can be done without penalty as the inner core satisfies the waveguiding index requirement. The display comprises an outer clad 240, providing a protective layer, the clad layer 241 a core layer 242 and a grating layer divided into an input grating 243 and a lossy output grating 244. The grating layer has an average refractive index substantially identical to that of the core. A typical ray path 1250-1252 is shown.

Figure 30:
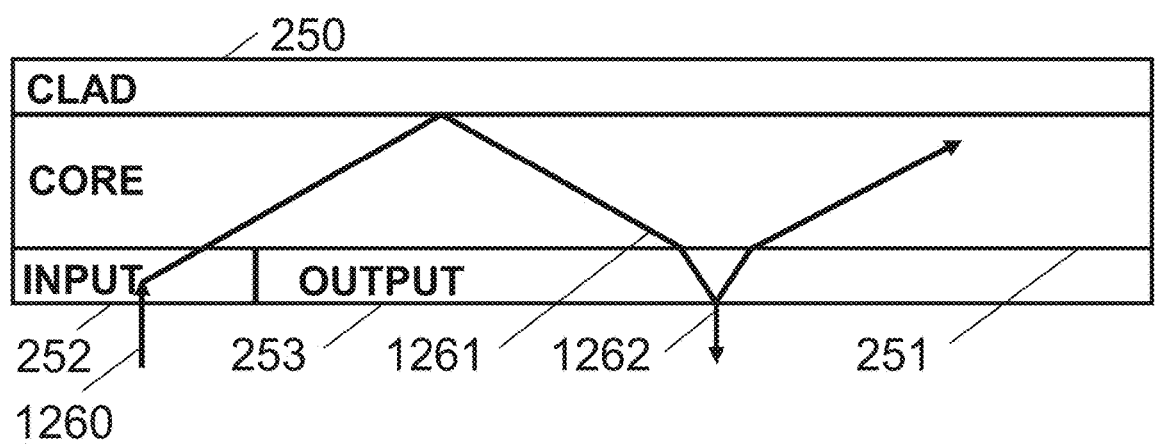
FIG. 30 is a section of a TIR waveguide device with an external protective layer in one embodiment.

In the embodiment of FIG. 30 the input and output grating layer media have a refractive index higher than that of the core. Since the clad layer has an index lower than that of the core it therefore allows TIR. The display comprises the external clad layer 250, providing a protective layer, a core layer 251 and a grating layer divided into an input grating 252 and a lossy output grating 253. A typical ray path 1260-1262 is shown.

Note that the grating layers in the above embodiments will in turn comprise a holographic material layer sandwiched by two substrates or alternatively a holographic material layer sandwiched by the core layer and a further substrate. The embodiments of FIGS. 28-31 may be used to provide curved or planar displays.

Figure 31:
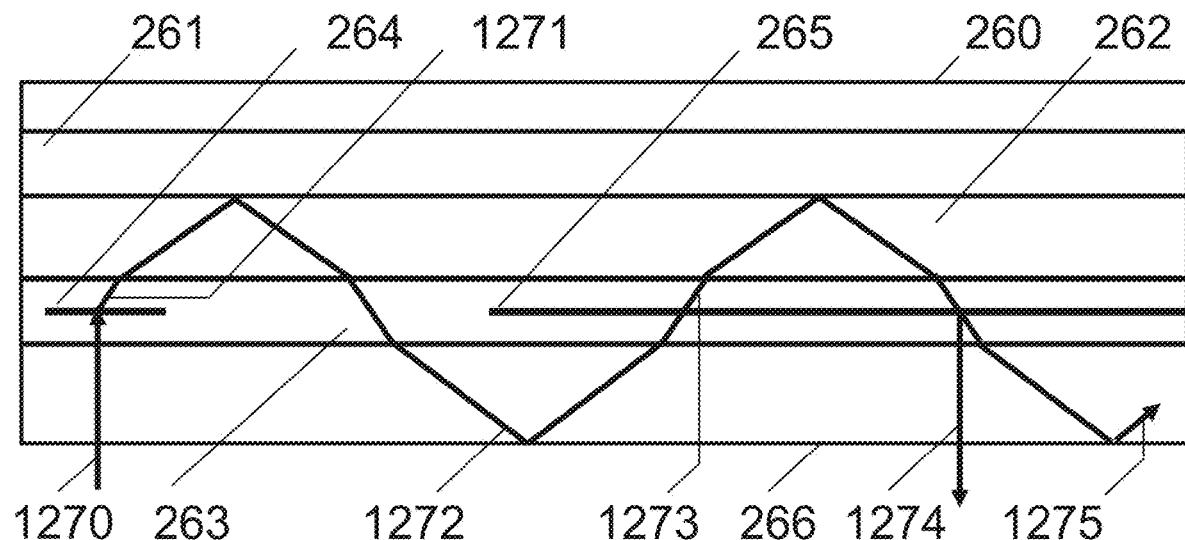
FIG. 31 is a section of a TIR waveguide device with an external protective layer in one embodiment.

In the embodiment of FIG. 31 the display comprises an upper glass layer 260 a low index layer 261, a layer 262 a grating layer 263 divided into an input grating 264 and a lossy output grating 265 which extracts light uniformly along the waveguide to provide an expanding exit pupil and a lower glass layer 266. The grating layer has an average refractive index substantially identical to that of the core. In one embodiment the low index layer is an adhesive material of refractive index 1.315 in the visible band. A typical ray path 1240-1242 is shown. In one embodiment the upper and lower glass layers 260,266 and the layer 262 each have a refractive index of approximately 1.5. An input ray is coupled into a TIR path inside the waveguide by the input grating and is eventually coupled out of the waveguide by the output grating. The structure as illustrated comprises a section of a windscreen. Typically, the overall thickness is around 4.4 mm. with the upper glass layer being equal in thickness to the waveguide stack comprising layers 261-266. A typical ray path is illustrated by 1270-1275. Noted the extraction of light by the output grating only takes for downward propagating rays; the Bragg condition is not met by the upward propagating rays.

Figure 32:
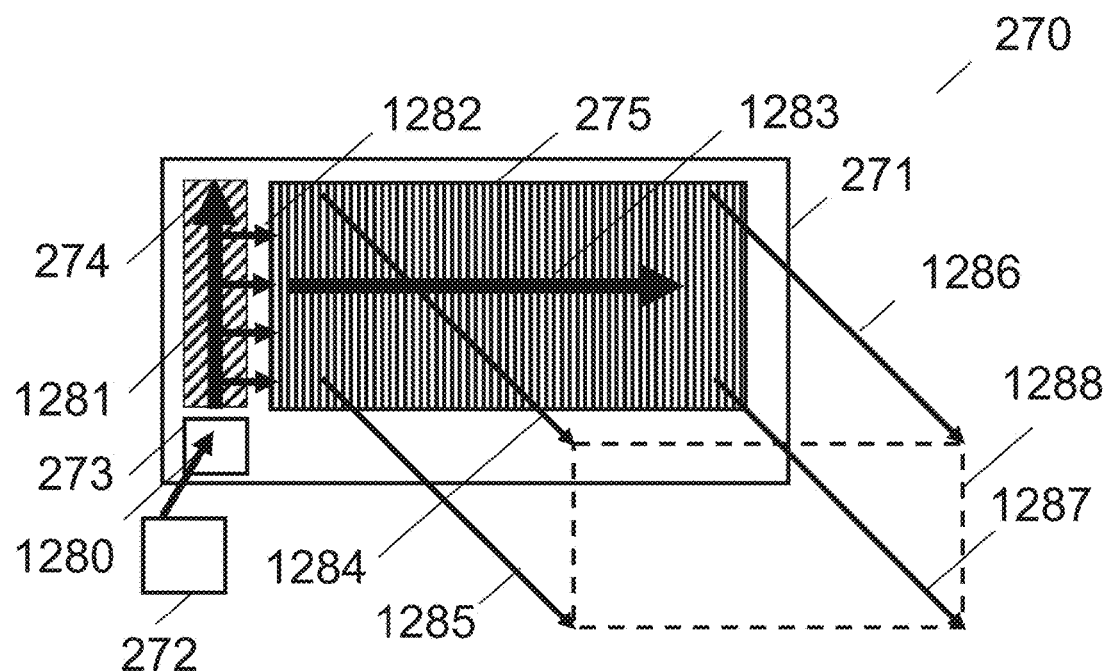
FIG. 32 is a waveguide display using an external protective layer according to the principles of the invention in one embodiment.

FIG. 32 illustrates an embodiment of the invention using the waveguide of FIGS. 28-31. The transparent display device 270, which may form part of a HUD or HMD, comprises a waveguide 271 into which are recording three gratings: an input grating 273 a fold or turning grating 274 and an output grating 275. The embodiments of FIGS. 28-31 represent a cross section of the embodiment of FIG. 32. The waveguide also contains a thin beamsplitter homogenizer layer for vertical and horizontal homogenization. The input grating has high efficiency for maximum light in-coupling efficiency. The output grating is a lossy grating for extracting light uniformly out of the waveguide along the beam path in the waveguide. In contrast to the input and output gratings which deflect light in a plane orthogonal to the waveguide the fold grating deflects light substantially in the plane of the waveguide. The formation of the image viewed from the eye box takes place in four stages. In the first stage the input coupler couples image light 1280 from an input image generator 272 into a vertical TIR path generally indicated by 1281 within the waveguide. Typically, the image generator will further comprise an illumination source such as a laser or LED, a microdisplay panel and a collimating lens. Advantageously, the input coupler grating uses a vertically rolled K-vector. The K-vector is a vector aligned normal to the grating planes (or fringes) which determines the optical efficiency for a given range of input and diffracted angles. Rolling the K-vectors allows the angular bandwidth of the grating to be expanded without the need to increase the waveguide thickness. The input grating has a horizontal aperture width large enough to mitigate horizontal illumination non-uniformity, commonly referred to as banding (resulting from the gaps that appear between the TIR beam paths after several bounces within the waveguide). Laser-illuminated waveguide displays are particularly susceptible to banding. In the second stage the fold grating and homogenizing beamsplitter together provide first axis of pupil expansion directing light into a TIR path 1283 in the output grating. Note that a single fold grating is used to support the field of view. In the third stage the output grating, which is a lossy grating, provides uniform output coupling along the waveguide thereby providing the second axis of pupil expansion. Finally, in the fourth stage collimated light generally indicated by 1284-1287 is output towards the eye box 1288 from which a collimated image of the full field of view may be viewed.

In one embodiment the apparatus of FIG. 32 is embedded in a vehicle windscreen. In such applications, the substrate indices used in the waveguide stack should be close the index currently used in windscreen glass, that is, around 1.5. The inventors propose to use a modified PVB with a slightly higher index than the PVB material currently used in windshields (typically 1.48-1.50). A higher index is desirable to keep the diffraction angle at an acceptably low level during holographic recording.

In the above-described embodiments in which GRIN waveguides are combined with grating waveguides that are not embedded within a GRIN structures the embodiments of FIGS. 28-31 may be used to environmentally isolate the grating waveguides.

The embodiments of FIGS. 28-31 may be applied to any of the waveguide display devices disclosed in PCT Application No.: GB2012/000677 entitled WEARABLE DATA DISPLAY, U.S. Pat. No. 8,233,204 entitled OPTICAL DISPLAYS, U.S. patent application Ser. No. 13/317,468 entitled COMPACT EDGE ILLUMINATED EYEGLASS DISPLAY, U.S. patent application Ser. No. 13/869,866 entitled HOLOGRAPHIC WIDE ANGLE DISPLAY, and U.S. patent application Ser. No. 13/844,456 entitled TRANSPARENT WAVEGUIDE DISPLAY and may benefit from the teachings provided therein.

Although the invention has been discussed in relation to a near eye display it should be apparent from consideration of the drawings that the invention may also be used in other displays such as Head Up Displays. The apparatus may also be used to provide an illumination system. By reversing the light paths the apparatus may also be used in an image sensing system. A further application of the invention is in an image delivery system for providing a secondary image source for use in microlens array light field display. The invention may also be applied to waveguide sensors such as eye trackers and fingerprint sensors.

A display according to the principles of the invention may include a waveguide despeckler based on principles disclosed in PCT Application No.: PCT/GB2013/000500 entitled WAVEGUIDE FOR HOMOGENIZING ILLUMINATION, and U.S. Pat. No. 8,224,133 entitled LASER ILLUMINATION DEVICE both of which are incorporated herein by reference in their entireties.

It should be emphasized that the drawings are exemplary and that the dimensions have been exaggerated.

Any of the above-described embodiments may be implemented using plastic substrates using the materials and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES. Advantageously, the SBGs are recorded in a reverse mode HPDLC material in which the diffracting state of SBG occurs when an electric field is applied across the electrodes. An eye tracker based on any of the above-described embodiments may be implemented using reverse mode materials and processes disclosed in the above PCT application.

The method of fabricating the SBG pixel elements and the ITO electrodes used in any of the above-described embodiments of the invention may be based on the process disclosed in the PCT Application No. US2006/043938, entitled METHOD AND APPARATUS FOR PROVIDING A TRANSPARENT DISPLAY.

It should be understood by those skilled in the art that while the present invention has been described with reference to exemplary embodiments, it is to be understood that the invention is not limited to the disclosed exemplary embodiments. Various modifications, combinations, sub-combinations and alterations may occur depending on design requirements and other factors insofar as they are within the scope of the appended claims or the equivalents thereof.

What is claimed is:

1. A waveguide display, comprising:
   a waveguide structure having external surfaces in contact with a low refractive index medium, wherein said wavequide structure is curved;
   a source of image modulated light projected over a field of view;
   an input coupler for directing said light into at least one optical path in said waveguide structure; and
   at least one grating for extracting light from said waveguide structure for viewing;
   wherein at least a portion of said waveguide structure has a lateral refractive index variation between said external surfaces that prevents rays propagating within said waveguide from optically interacting with at least one of said external surfaces, and
   wherein at least one intermediate image surface is formed within said waveguide.

2. The waveguide display of claim 1, wherein said light extracted from said waveguide structure for viewing forms an image surface disposed at an angle to said intermediate image surface.

3. The waveguide display of claim 1, wherein said light extracted from said waveguide structure for viewing forms an image surface that is substantially orthogonal to said intermediate image surface.

4. The waveguide display of claim 1, wherein said light extracted from said waveguide structure for viewing forms an image surface disposed an angle in the range from 0 degrees to 90 degrees to said intermediate image surface.

5. The waveguide display of claim 1, wherein said at least one grating is substantially parallel to a total internal reflection surface of said waveguide structure.

6. The waveguide display of claim 1, wherein said intermediate image surface is substantially orthogonal to a total internal reflection surface of said waveguide structure.

7. The waveguide display of claim 1, wherein said waveguide structure further comprises at least one selected from the group of:
   a GRIN medium for providing at least part of said lateral refractive index variation;
   a GRIN medium at least partially enclosing said grating;
   a GRIN medium optically coupled to a waveguide portion supporting said grating;
   a GRIN medium optically coupled to a waveguide portion in which light propagates under total internal reflection between said external surfaces;
   a homogeneous refractive index material layer in contact with air;
   a homogeneous refractive index material layer in contact with said grating;
   a homogeneous refractive index material layer sandwiched by layers of lower refractive index;
   a homogeneous refractive index material layer sandwiched by air and a layer of higher refractive index;
   a homogeneous refractive index material layer of refractive index greater than the average refractive index of said grating;
   a homogeneous refractive index material layer of refractive index substantially the same as the average refractive index of said grating;
   a homogenous refractive index material layer of refractive index less than the average refractive index of said grating;
   a surface of said grating in contact with air;
   a beam splitter layer; and
   at least one additional grating.

8. The waveguide display of claim 7, wherein total internal reflection can occur between the outermost surfaces of a set of layers selected from said group.

9. The waveguide display of claim 1, wherein said at least one grating is sandwiched by transparent substrates.

10. The waveguide display of claim 1, wherein said at least one grating is one of a Bragg grating, a surface relief grating, a switchable Bragg grating recorded in a HPDLC material, a uniform modulation HPDLC material or a reverse mode HPDLC material.

11. The waveguide display of claim 1, wherein said low refractive index medium is air.

12. The waveguide display of claim 1, wherein said input coupler is a grating.

13. The waveguide display of claim 1, wherein said image modulated light is collimated prior to being coupled into said waveguide structure.

14. The waveguide display of claim 1, wherein said waveguide structure comprises planar waveguide elements abutting end to end.

15. The waveguide display of claim 1, wherein said waveguide structure is configured to provide one of a heads-up display, a head mounted display, or a light field display.

16. A waveguide display, comprising:
a waveguide structure having external surfaces in contact with a low refractive index medium;
a source of image modulated light projected over a field of view;
an input coupler for directing said light into at least one optical path in said waveguide structure; and
at least one grating for extracting light from said waveguide structure for viewing;
wherein at least a portion of said waveguide structure has a lateral refractive index variation between said external surfaces that prevents rays propagating within said waveguide from optically interacting with at least one of said external surfaces,
wherein at least one intermediate image surface is formed within said waveguide, and
wherein said at least one grating is substantially orthogonal to said image surface.

17. A waveguide display, comprising:
a waveguide structure having external surfaces in contact with a low refractive index medium;
a source of image modulated light projected over a field of view;
an input coupler for directing said light into at least one optical path in said waveguide structure; and
at least one grating for extracting light from said waveguide structure for viewing;
wherein at least a portion of said waveguide structure has a lateral refractive index variation between said external surfaces that prevents rays propagating within said waveguide from optically interacting with at least one of said external surfaces,
wherein at least one intermediate image surface is formed within said waveguide, and
wherein said at least one grating is substantially orthogonal to a total internal reflection surface of said waveguide structure.

18. A waveguide display, comprising:
a waveguide structure having external surfaces in contact with a low refractive index medium;
a source of image modulated light projected over a field of view;
an input coupler for directing said light into at least one optical path in said waveguide structure; and
at least one grating for extracting light from said waveguide structure for viewing;
wherein at least a portion of said waveguide structure has a lateral refractive index variation between said external surfaces that prevents rays propagating within said waveguide from optically interacting with at least one of said external surfaces,
wherein at least one intermediate image surface is formed within said waveguide, and
wherein said at least one grating has spatially varying refractive index modulation.

19. A waveguide display, comprising:
a waveguide structure having external surfaces in contact with a low refractive index medium;
a source of image modulated light projected over a field of view;
an input coupler for directing said light into at least one optical path in said waveguide structure; and
at least one grating for extracting light from said waveguide structure for viewing;
wherein at least a portion of said waveguide structure has a lateral refractive index variation between said external surfaces that prevents rays propagating within said waveguide from optically interacting with at least one of said external surfaces,
wherein at least one intermediate image surface is formed within said waveguide, and
wherein said waveguide structure further comprises at least one grating selected from the group of: a rolled K-vector grating; a grating with spatially varying refractive index modulation; and gratings configured for providing beam expansion in at least one of two orthogonal directions.

* * * * *